(12) United States Patent
Chen

(10) Patent No.: US 11,836,891 B2
(45) Date of Patent: Dec. 5, 2023

(54) IMAGE RELATED PROCESSING METHOD AND APPARATUS, DEVICE AND STORAGE MEDIUM

(71) Applicant: TENCENT TECHNOLOGY (SHENZHEN) COMPANY LIMITED, Guangdong (CN)

(72) Inventor: Fa Sheng Chen, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 794 days.

(21) Appl. No.: 16/928,383

(22) Filed: Jul. 14, 2020

(65) Prior Publication Data
US 2020/0342572 A1 Oct. 29, 2020

Related U.S. Application Data

(63) Continuation of application No. PCT/CN2019/078685, filed on Mar. 19, 2019.

(30) Foreign Application Priority Data

Apr. 2, 2018 (CN) .......................... 201810285137.4

(51) Int. Cl.
G06T 3/40 (2006.01)
G06N 3/04 (2023.01)
(Continued)

(52) U.S. Cl.
CPC ............. *G06T 3/4046* (2013.01); *G06N 3/04* (2013.01); *G06N 3/08* (2013.01); *G06T 3/4053* (2013.01); *H04N 21/2393* (2013.01)

(58) Field of Classification Search
CPC ....... G06T 3/4046; G06T 3/4053; G06N 3/04; G06N 3/08; G06N 3/045; H04N 21/2393;
(Continued)

(56) References Cited

U.S. PATENT DOCUMENTS

| 9,237,297 | B1 * | 1/2016 | Waddell | ............. H04N 21/2393 |
| 2015/0226488 | A1 * | 8/2015 | Martin | .................... F27D 21/02 250/208.1 |

(Continued)

FOREIGN PATENT DOCUMENTS

| CN | 105744357 | A | 7/2016 |
| CN | 105898565 | * | 8/2016 |

(Continued)

OTHER PUBLICATIONS

Machine translation for CN 105898565 (Year: 2016).*
(Continued)

Primary Examiner — Qian Yang
(74) Attorney, Agent, or Firm — Sughrue Mion, PLLC

(57) ABSTRACT

A method and apparatus, device, and storage medium for generating an image processing model and processing images based on the generated image processing model. The method includes generating an initial model for an image resolution processing, the initial model comprising an input layer, an output layer, and an intermediate layer; obtaining a training image comprising a first image and a second image, the first image being obtained by performing a resolution reduction processing on the second image; inputting image data of the first image into the intermediate layer from the input layer for a convolution calculation, and obtaining result data based on the convolution calculation, the result data comprising channel output data of N*N channels; and performing a parameter update on convolution kernel parameters in the intermediate layer based on the result data and the second image, and generating the image processing model according to the initial model.

18 Claims, 9 Drawing Sheets

(51) Int. Cl.
*G06N 3/08* (2023.01)
*H04N 21/239* (2011.01)

(58) Field of Classification Search
CPC ......... H04N 21/4666; H04N 21/41407; H04N 21/4356; H04N 21/440263
See application file for complete search history.

(56) References Cited

U.S. PATENT DOCUMENTS

2017/0201445 A1* 7/2017 Chaudhry ........... G06F 16/9577
2017/0256033 A1   9/2017 Tuzel et al.

FOREIGN PATENT DOCUMENTS

| CN | 107220934 A | 9/2017 |
| CN | 107240066 A | 10/2017 |
| CN | 107578377 A | 1/2018 |
| CN | 108259997 A | 7/2018 |

OTHER PUBLICATIONS

Machine translation for CN 107220934, IDS (Year: 2017).*
Translation of Written Opinion of PCT/CN2019/078685 dated Jun. 12, 2019 [PCT/ISA/237].
D. Glasner et al., "Super-Resolution from a Single Image", IEEE 12th International Conference on Computer Vision (ICCV), 2009, pp. 349-356 (8 Pages Total).
Communication dated Mar. 17, 2021, from the European Patent Office in European Application No. 19782328.9.
International Search Report of PCT/CN2019/078685 dated Jun. 12, 2019 [PCT/ISA/210].
Written Opinion of PCT/CN2019/078685 dated Jun. 12, 2019 [PCT/ISA/237].
Search Report and Office Action of Chinese Application No. 201810285137.4 dated Apr. 28, 2019.
Kato, Y., et al., "Image Super-Resolution with Multi-Channel Convolutional Neural Networks", 2016 14th IEEE International New Circuits and Systems Conference, Jun. 26, 2016, XP032983346, 4 pages.
Communication dated Jun. 2, 2023 issued by the European Patent Office in application No. 19782328.9.

* cited by examiner

IMAGE RELATED PROCESSING METHOD AND APPARATUS, DEVICE AND STORAGE MEDIUM

CROSS-REFERENCE TO RELATED APPLICATION(S)

This application is a continuation of PCT/CN2019/078685, and is based on and claims priority to Chinese Patent Application No. 201810285137.4, entitled "IMAGE RELATED PROCESSING METHOD AND APPARATUS, DEVICE AND STORAGE MEDIUM", filed with the National Intellectual Property Administration, on Apr. 2, 2018, which are incorporated by reference in their entireties.

BACKGROUND

1. Field

The present disclosure relates to the field of image processing technologies, and in particular, to an image related processing method and apparatus, a device, and a storage medium.

2. Description of Related Art

With the development of network technologies and electronic technologies, users may obtain various information from various servers and other clients through networks. The information includes images, videos, or the like. Based on an application being installed on a terminal, a user may watch a video or browse an image at any time.

To obtain better watching experience of videos or images, users expect to watch high-definition videos or images. To provide a high-definition image to a user more quickly in a timely manner, some methods for performing super-resolution processing on an image are currently being provided. A higher-resolution image can be provided to the user by performing super-resolution processing on an image such as a video frame or a picture.

In most of the existing super-resolution processing methods, a plurality of groups of low-resolution images and high-resolution images that are in one-to-one correspondence are constructed through a simulation manner, and then, mapping relationship between the low-resolution images and the high-resolution images is learned through a machine learning method. A simulation procedure includes obtaining a group of high-resolution images and performing an interpolation processing on each image to reduce resolutions of the images. In this way, the plurality of groups of low-resolution images and high-resolution images that are in one-to-one correspondence are obtained. The plurality of groups of low-resolution images and high-resolution images that are in one-to-one correspondence may be obtained by performing the interpolation processing through a bilinear interpolation processing manner to reduce the resolutions. After the low-resolution images are obtained, the corresponding high-resolution images may be found according to the mapping relationship between the low-resolution images and the high-resolution images, and outputted to the user.

The technique of implementing a super-resolution processing through training an image processing model continues to advance and is a growing topic of research.

SUMMARY

Embodiments of the disclosure relates to an image processing method and apparatus, a device, and a storage medium to provide an image processing model that can implement a high-quality super-resolution processing on an image.

According to an embodiment, there is provided a method for generating an image processing model performed by a computing device. The method includes generating, based on a convolutional neural network, an initial model for an image resolution processing, the initial model comprising an input layer, an output layer, and an intermediate layer; obtaining a training image, the training image comprising a first image and a second image, the first image being an image obtained by performing a resolution reduction processing of N times on the second image; inputting image data of the first image into the intermediate layer from the input layer for a convolution calculation, and obtaining result data of the convolution calculation from the output layer, the result data comprising channel output data of N*N channels, N being a positive integer greater than or equal to 2; and performing a parameter update on convolution kernel parameters in the intermediate layer based on the result data and the second image, and generating the image processing model according to the initial model on which the parameter update is performed.

According to an embodiment, there is provided an apparatus for generating an image processing model, including at least one memory configured to store computer program code; and at least one processor configured to access the memory and operate as instructed by the computer program code. The computer program code includes: generation code configured to cause the at least one processor to generate, based on a convolutional neural network, an initial model for an image resolution processing, the initial model comprising an input layer, an output layer, and an intermediate layer; obtaining code configured to cause the at least one processor to obtain a training image, the training image comprising a first image and a second image, and the first image being an image obtained by performing a resolution reduction processing of N times on the second image; calculation code configured to cause the at least one processor to input image data of the first image into the intermediate layer from the input layer for convolution calculation, and obtain result data of the convolution calculation from the output layer, the result data comprising channel output data of N*N channels, N being a positive integer greater than or equal to 2; and processing code configured to cause the at least one processor to perform a parameter update on convolution kernel parameters in the intermediate layer based on the result data and the second image, and generate the image processing model according to the initial model on which the parameter update is performed.

According to an embodiment, there is provided a non-transitory computer-readable storage medium, storing computer program instructions, the computer program instructions, when executed by a processor, causes the processor to: generate, based on a convolutional neural network, an initial model for an image resolution processing, the initial model comprising an input layer, an output layer, and an intermediate layer; obtain a training image, the training image comprising a first image and a second image, the first image being an image obtained by performing a resolution reduction processing of N times on the second image; input image data of the first image into the intermediate layer from the input layer for a convolution calculation, and obtaining result data of the convolution calculation from the output layer, the result data comprising channel output data of N*N channels, N being a positive integer greater than or equal to 2; and perform a parameter update on convolution kernel parameters in the intermediate layer based on the result data and the second image, and generating the image processing model according to the initial model on which the parameter update is performed.

BRIEF DESCRIPTION OF THE DRAWINGS

To describe the technical solutions in embodiments of the disclosure more clearly, the following briefly describes the accompanying drawings for describing the embodiments. The accompanying drawings show only some embodiments of the disclosure, and a person of ordinary skill in the art may derive other drawings from these accompanying drawings without creative efforts.

DESCRIPTION

In the embodiments of the disclosure, an image processing may include performing a super-resolution processing on an image. Here, the super-resolution processing is processing of a low-resolution image to obtain a corresponding high-resolution image. For example, an image resolution of 1080P may be obtained after performing the super-resolution processing on an image that has a resolution of 540P. In a super-resolution processing procedure, representation values of each pixel in a low-resolution image are first obtained. Based on the representation values of each pixel of the low-resolution image, calculation is performed on the representation values based on a trained and optimized image processing model to output multichannel data, thereby obtaining a plurality of values related to each representation value. The values are used as representation values of new pixels in an image on which super-resolution processing is performed. Accordingly, a high-resolution image may be generated through arrangements based on the representation values of the new pixels.

Figure 1:
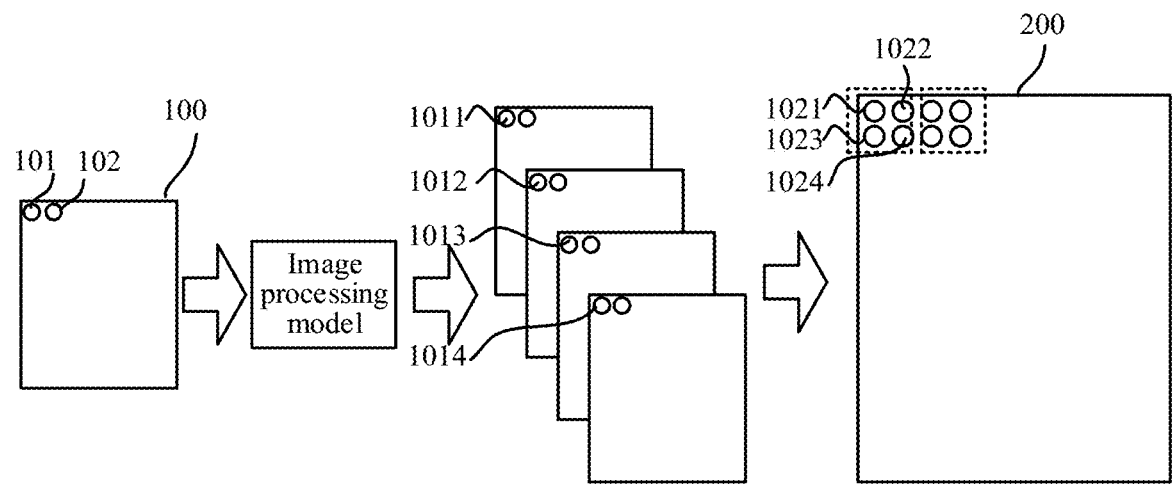
FIG. 1 is a schematic diagram of an image processing procedure according to an embodiment.

FIG. 1 is a schematic diagram of an image processing procedure according to an embodiment. The image processing procedure may include obtaining a low resolution image, using an image processing model to perform super-resolution processing of N times to output data of N*N channels, obtaining new representation values based on the data, and generating a high-resolution image based on the new representation values to obtain an expected target image, where N is a positive integer greater than or equal to 2. In an embodiment, the representation value may be a lightness value V of a pixel, a luminance value L of a pixel, luminance channel data (that is, a Y-channel value of a pixel), any one or combination of a red (R) value, a green (G) value, and a blue (B) value of a pixel, grayscale values of channels of a multispectral camera, grayscale values of channels of a special camera (such as an infrared camera, an ultraviolet camera, or a depth camera), or the like.

In an embodiment, performing super-resolution processing of N times on a low-resolution image is mainly converting each pixel in the low-resolution image into N*N pixels based on an image processing model. For example, when N is equal to 2, a resolution of the low-resolution image needs to be scaled up to 2 times of the resolution, that is, super-resolution processing of 2 times is performed on the low-resolution image. That is, one pixel in the low-resolution image needs to be processed into 2*2 pixels, that is, 4 pixels. A representation value of one pixel needs to be calculated based on an image processing model to obtain four values, and the four values are corresponding representation values of a pixel of a high-resolution image.

As shown in FIG. 1, a low-resolution image 100 includes a plurality of pixels 101, 102 and so on. The super-resolution processing may be performed by an image processing model to output result data. The result data includes channel output data of 2*2, that is, 4 channels. A high-resolution image 200 may be obtained based on the result data. In an embodiment, for a vertex pixel 101 located at a vertex in the upper left corner of the low-resolution image 100, the image processing model may obtain four values corresponding to the vertex pixel 101 through calculation based on a representation value of the vertex pixel 101, and the four values respectively correspond to a value 1011, a value 1012, a value 1013, and a value 1014 in the channel output data of the 2*2 channels. After the high-resolution image 200, that is, a target image, is generated based on the channel output data of the four channels, the four values are respectively representation values of an upper left pixel 1021, an upper right pixel 1022, a lower left pixel 1023, and a lower right pixel 1024 in an upper left corner area (a first area in a left dashed box in FIG. 1) of the high-resolution image 200. Image locations of new pixels in the target image are determined with reference to image locations of original pixels in the low-resolution image 100. For example, the vertex pixel 101 in the low-resolution image 100 corresponds to the four pixels in the upper left corner area (or the first area) in the high-resolution image 200. In addition, an area which corresponds to a pixel 102 (a pixel in a first row and a second column in the low-resolution image 100) in the high-resolution image 200 is a second area shown on the right, adjacent to the first area, in another dashed box in FIG. 1. The pixel 102 in the low-resolution image 100 corresponds to four pixels in the second area of the high-resolution image 200. Furthermore, location areas in the high-resolution image 200, which correspond to other pixels in the low-resolution image 100, can be deduced by analogy. However, the arrangement of the areas in the high-resolution image is not limited thereto, and may be arranged in various forms. In addition, if a super-resolution processing of 3 times is performed, the vertex pixel 101 corresponds to 3*3, that is, 9 pixels in the upper left corner area. Here, the super-resolution processing is not limited thereto, and may be processed N times, where N is any positive integer greater than or equal to 2.

The foregoing mentioned image processing model may be generated based on a convolutional neural network. For different multiple super-resolution image processing, image processing models may be configured with different quantities of output channels. A value of channel output data of each output channel is the representation value of the pixel at the location corresponding to the original pixel in the low-resolution image on which super-resolution processing is performed. In an embodiment, a plurality of image processing models may be set. Each image processing model includes different quantities of output channels. In this way, after the low-resolution image on which super-resolution processing needs to be performed is received, a target image processing model may be selected from the plurality of image processing models according to multiples of super-resolution processing to implement super-resolution processing on the low-resolution image through the target image processing model. For example, an image processing model including 2*2 output channels may be set, so that super-resolution processing of 2 times may be satisfied. Alternatively, an image processing model including 3*3 output channels may be set, so that super-resolution processing of 3 times may be satisfied. In this way, for an application such as a video player, the user may select different resolutions to request to play a video, an image, or the like. For example, for a video with 540P resolution, if the user selects super-resolution processing of 2 times, the user may watch a video at 1080P resolution, and if the user selects super-resolution processing of 4 times, the user may watch a video at 2K resolution.

The image processing model needs to be trained and optimized. In this embodiment, on the basis that an initial model used for performing resolution processing on an image is generated, the initial model may be trained and optimized based on training data to obtain the image processing model capable of performing super-resolution processing according to the user's need. Also, the image processing model may use a new initial model at any time to be further optimized and processed as required, so as to more accurately implement super-resolution processing on an image.

Figure 2:
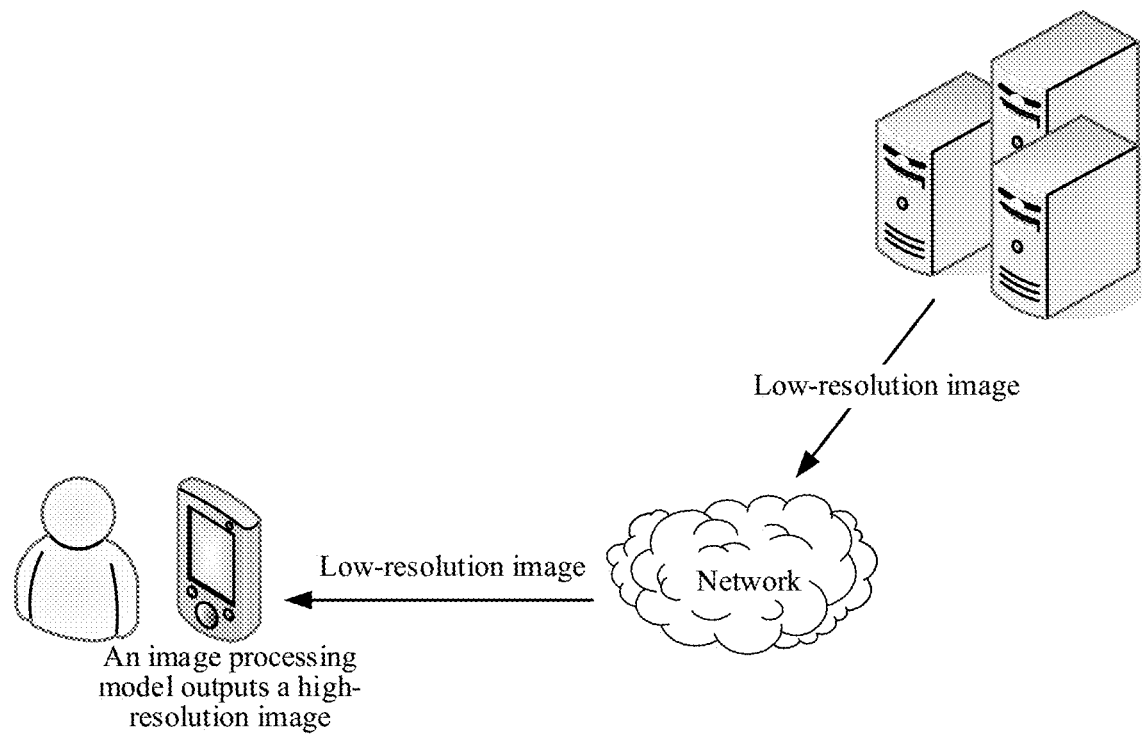
FIG. 2 is a schematic diagram of a scenario of an applied image processing model according to an embodiment.

FIG. 2 is a schematic diagram of a scenario of an applied image processing model according to an embodiment. An image processing model that is trained and optimized may be configured in a video playing application. The application may be installed in an intelligent terminal including functions such as image display and video playing, for example, a smartphone, a tablet computer, a personal computer (PC), or an intelligent wearable device. The video playing application may be, for example, various applications capable of playing a video and displaying an image. A user may request to play a video or display an image after opening the video playing application in the intelligent terminal. In an embodiment, when the user requests to play a video, the intelligent terminal may request the video from a server providing a video playing service. After receiving the video from the server, the intelligent terminal extracts a low-resolution video from the received video, determines each video frame in the low-resolution video as low-resolution images, and inputs the low-resolution images into an image processing model as to-be-processed images. The image processing model performs super-resolution processing on the to-be-processed images, and correspondingly obtains high-resolution images, or target images. Each target image corresponds to one video frame. After the target images are obtained, the video playing application sequentially plays the target images according to factors, such as a playing time sequence, to play a high-resolution video. In another embodiment, the intelligent terminal may alternatively cache the obtained target images, and obtain and play the video based on factors such as a playing time sequence after a preset amount of data is cached. Similarly, when receiving a single image, the intelligent terminal may directly use the single image as the to-be-processed image to perform super-resolution processing on the single image, and display the processed image to the user. As such, the intelligent terminal may only download data of the low-resolution video, which reduces occupation of bandwidth, and saves traffic of the intelligent terminal. Also, the server only needs to store the data of the low-resolution video, which may save storage space of the server. When the intelligent terminal performs super-resolution processing on the low-resolution images, a video with higher-definition may be displayed to the user. The user may request to perform display switching between a low-resolution image and a high-resolution image. For example, the user may tap on a switching button displayed on the intelligent terminal to switch from the low-resolution to the high-resolution, or vice versa. However, the embodiment is not limited thereto, and the intelligent terminal may receive user's operations through an application interface or through any other means.

Figure 3A:
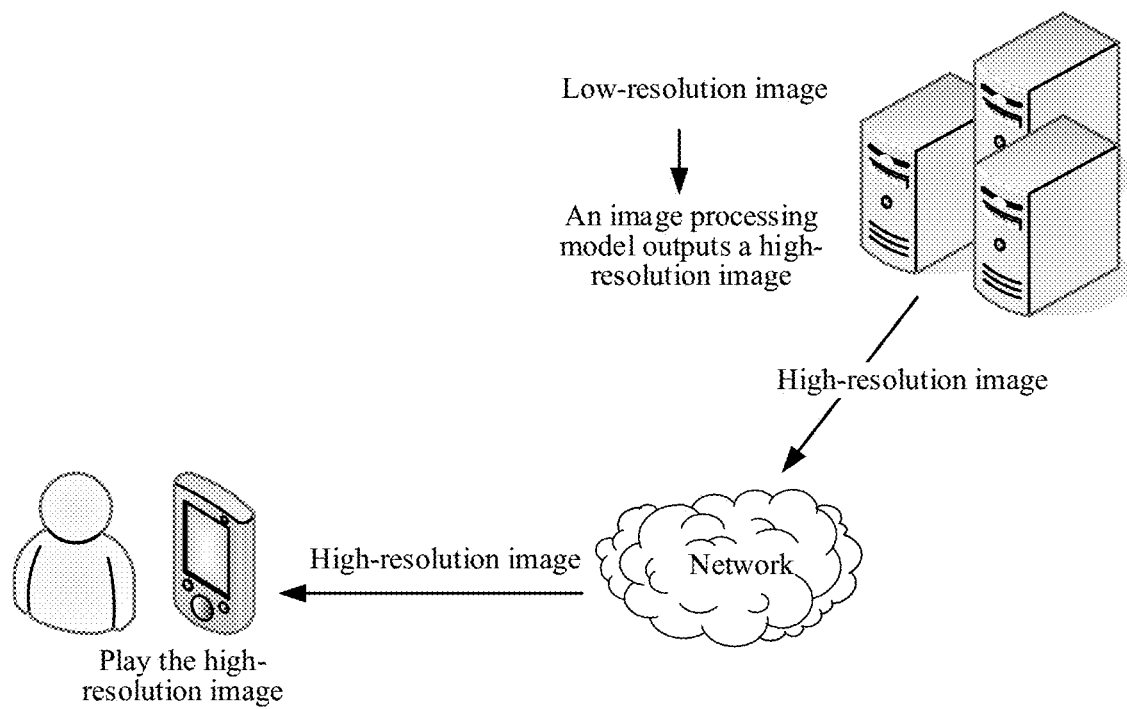
FIG. 3a is a schematic diagram of a scenario of another applied image processing model according to an embodiment.

FIG. 3a is a schematic diagram of a scenario of another applied image processing model according to an embodiment. An image processing model that is trained and optimized may be configured in an application server to provide a video playing service or an image display service. A corresponding video playing application may be installed in the intelligent terminal. The application server may store low-resolution videos or images. When a user requests to watch the low-resolution videos or images through the video playing application installed in the intelligent terminal, the application server may send data of the low-resolution videos or images to the intelligent terminal, and display the data to the user through the video playing application installed in the intelligent terminal. When watching a low-resolution video, if the user intends to watch a high-resolution video, the user may tap on a high-resolution playing button set on an application interface. In this case, the intelligent terminal sends a high-resolution playing request of N times to the server. In response to the high-resolution playing request, the server determines data of the low-resolution video on which super-resolution processing is to be performed, obtains a to-be-processed image (such as a single low-resolution picture or a video frame in a low-resolution video), performs super-resolution processing through an image processing model to obtain a target image, and transmits the target image to the intelligent terminal. The intelligent terminal may display a high-resolution image or sequentially play the high-resolution target images according to factors, such as a playing time sequence through the video playing application.

Figure 3B:
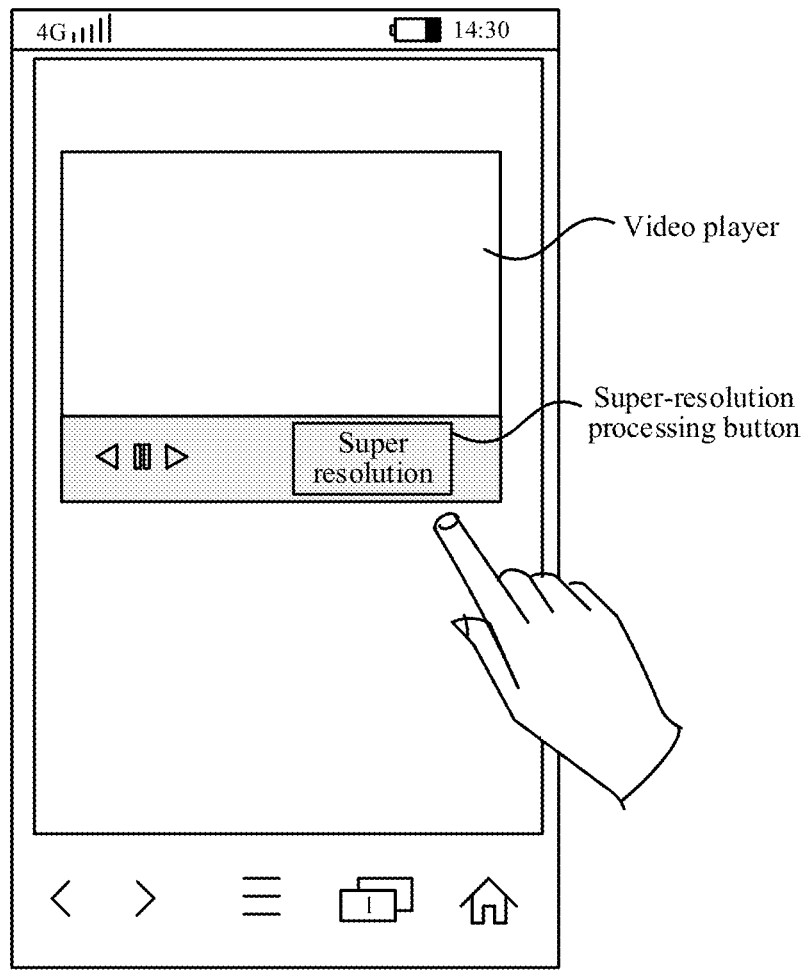
FIG. 3b is a schematic diagram of a video playing interface according to an embodiment.

FIG. 3b is a schematic diagram of a video playing interface according to an embodiment. In this embodiment, the video playing application may be a video player. After a user taps a "super-resolution" processing button in the lower right corner of the interface, super-resolution processing is performed on a video or an image by the video playing application according to the manner corresponding to FIG. 2, or by the application server according to the manner corresponding to FIG. 3a, to provide a high-resolution video or image to the user. The "super-resolution" processing button in the lower right corner of the interface may alternatively be configured as a plurality of buttons. For example, one of the plurality of buttons may be configured as an icon button of "super-resolution of 2 times", or an icon button of "super-resolution of 4 times". In an embodiment, the server may switch between a low-resolution image and a high-resolution image based on network resource information between the server and the terminal. When the network resource information satisfies a condition (for example, when bandwidth is sufficient), the low-resolution image is automatically converted into a high-resolution target image to be sent to the user. When the network resource information does not satisfy the condition (for example, when the bandwidth is relatively small), the low-resolution image is sent to the user to be processed at the intelligent terminal.

The following describes an image processing procedure according to an embodiment. A first aspect includes establishing an image processing model and training and optimizing the image processing model, a second aspect includes further optimizing the trained and optimized image processing model, and a third aspect includes a procedure of performing super-resolution processing on an image based on the trained image processing model.

A generation procedure of the image processing model may include generating, based on a convolutional neural network, an initial model used for image resolution processing, the initial model including an input layer, an output layer, and an intermediate layer. In the initial model, the input layer includes an input channel which is mainly used for inputting image data of a training image. The image data is a representation value of each pixel of the training image. The representation value may be a lightness value of each pixel, a luminance value of each pixel, a Y-channel value of each pixel, any one or more of a R value, a G value, and a B value of each pixel, any one or more of grayscale values of channels of a multispectral camera and grayscale values of channels of a special camera (such as an infrared camera, an ultraviolet camera, or a depth camera), or the like. That is, any two-dimensional data may be used to train an image processing model for correspondingly processing the data. An image processing model capable of performing super-resolution processing on a low-resolution image may be obtained through training based on the lightness value of each pixel, the luminance value of each pixel, the Y-channel value of each pixel, any one or more of the R value, the G value, and the B value of each pixel, or the like. Through the grayscale values of the channels of the special camera, an image processing model capable of performing super-resolution processing on grayscale values of corresponding channels of the special camera such as an infrared camera, an ultraviolet camera, or a depth camera may be obtained through training. Even an image processing model capable of performing super-resolution processing on an image such as a geological radar image or a remote-sensing image may further be obtained through training. The input layer of the initial model may alternatively include a plurality of input channels to perform super-resolution processing on a plurality of pieces of data of the image. For example, the initial model may include three input channels to simultaneously input the R value, the G value, and the B value of the image to perform super-resolution processing on RGB.

The output layer of the initial model includes N*N output channels. Channel output data outputted by each channel constitutes result data. Each value in the result data corresponds to a representation value of one pixel in the target image on which super-resolution processing is performed. Corresponding to the foregoing image data that is inputted into the input channel, the representation value corresponding to the value in the outputted result data includes the lightness value of each pixel, the luminance value of each pixel, the Y-channel value of each pixel, the R value, the G value, and the B value of each pixel, or the like.

In an embodiment, if the input layer includes M input channels (where M is a positive integer), the output layer includes M*N*N output channels. For example, if the R value, the G value, and the B value are inputted into the input layer, 3*N*N (that is, M=3) is to be outputted, and each continuous N*N output channels respectively correspond to the R value, the G value, and the B value. For example, for super-resolution processing of 2 times, the first four output channels (such as output channels numbered 1, 2, 3, and 4) corresponding to the R value, the middle four output channels (such as output channels numbered 5, 6, 7, and 8) correspond to the G value, and the last four output channels (such as output channels numbered 9, 10, 11, and 12) correspond to the B value.

The intermediate layer may include a plurality of convolution layers. Generally, more convolution layers lead to more detailed calculation. When super-resolution processing is performed with the plurality of convolution layers, the image quality of the obtained target image may be better and image noise may be reduced.

Figure 4:
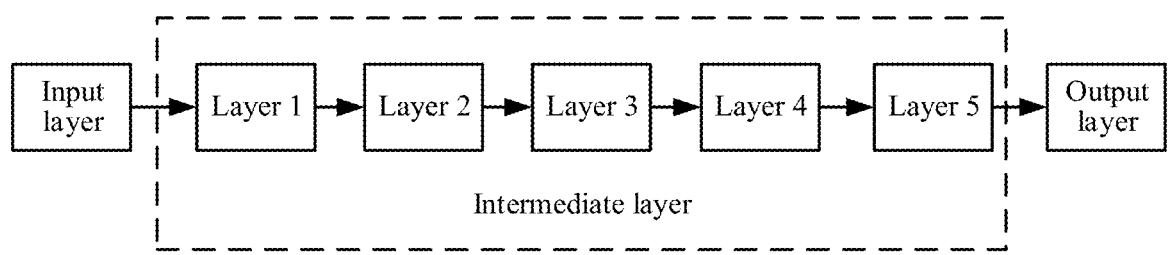
FIG. 4 is a schematic structural diagram of an initial model according to an embodiment.

FIG. 4 is a schematic structural diagram of an initial model according to an embodiment. The initial model includes an input layer, an output layer, and an intermediate layer such as an intermediate layer including five convolution layers. Related parameters of each convolution layer are shown in Table 1 below. The initial model is trained and optimized through a training image to obtain an image processing model that may be accessible through online for use. The training image includes a large amount of image data. The image data includes a first image and a second image. The first image is an image obtained by performing resolution reduction processing of N times on the second image. That is, the low-resolution first image is obtained through downsampling by only obtaining the high-resolution second image. For the low-resolution first image, because the high-resolution second image corresponding to the first image already exists as a reference standard, a super-resolution processing capability of the initial model on the low-resolution first image can be measured, so that training and optimization is more accurate.

TABLE 1

| Layer | Type | Size of convolution kernel | Quantity of output channels | Quantity of convolution kernels | Step | Pad |
|---|---|---|---|---|---|---|
| 1 | Convolution | 3 × 3 | 16 | 1 group in total, and 16 convolution kernels in each group | 1 | 1 |

TABLE 1-continued

| Layer | Type | Size of convolution kernel | Quantity of output channels | Quantity of convolution kernels | Step | Pad |
|---|---|---|---|---|---|---|
| 2 | Convolution | 3 × 3 | 32 | 16 groups in total, and 32 convolution kernels in each group | 1 | 1 |
| 3 | Convolution | 3 × 3 | 32 | 32 groups in total, and 32 convolution kernels in each group | 1 | 1 |
| 4 | Convolution | 3 × 3 | 32 | 32 groups in total, and 32 convolution kernels in each group | 1 | 1 |
| 5 | Convolution | 3 × 3 | 4 | 32 groups in total, and 4 convolution kernels in each group | 1 | 1 |

Further to the information listed in Table 1, a convolution layer including more (or fewer) layers may be used, and the size of the convolution kernel may be variously adjusted. A quantity of input channels of a first layer of the convolution layers is generally 1, that is, image data of one to-be-processed image is inputted. A quantity of input channels of another convolution layer in the intermediate layer may be equal to a quantity of output channels of a previous convolution layer connected to the other convolution layer of the intermediate layer. For example, a quantity of input channels of a second convolution layer (Layer 2) in the intermediate layer may be equal to a quantity of output channels of a first convolution layer (Layer 1) of the intermediate layer. Here, each convolution layer may include a plurality of convolution kernels as will be described with reference to FIG. 5. Input data corresponding to the convolution layer of the intermediate layer is output data of the previous convolution layer. For example, if the quantity of the input channels of the first convolution layer in Table 1 is 1, and a quantity of output channels of the first convolution layer is 16, a quantity of input channels of a second convolution layer is 16, which is the same as the quantity of output channels of the first convolution layer. For the quantity of output channels, aside from a last convolution layer in the intermediate layer, quantities of output channels of other convolution layers may be variously configured. A quantity of output channels of the last convolution layer needs to be determined according to multiples of super-resolution processing. If a resolution needs to be improved by N times, the quantity of output channels of the last convolution layer needs to be N*N. For example, as shown in Table 1, 4 output channels are configured to implement super-resolution processing of 2 times (2*2). The size of the convolution kernel may be user-defined, for example, an odd number greater than 2. The size of the step may be 1, so that it may be ensured that each convolution calculation of the convolution layers does not lead to zoom-out of the image. A Pad value corresponding to the size of convolution kernels and the step needs to be further calculated and obtained. The Pad value determines a quantity of pixels copied outwards in width when convolution calculation is performed to ensure that a width and a height of the image are not reduced during each convolution operation. A calculation method of the Pad value is: Pad=(the size of the convolution kernel–the step)/2. Using Table 1 as an example, when the size of the convolution kernel is 3, Pad=(3−1)/2=1.

Figure 5:
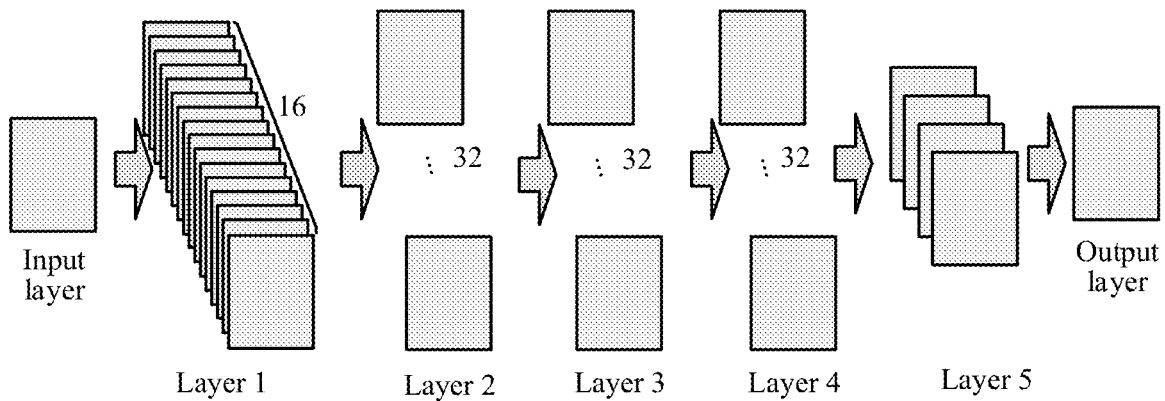
FIG. 5 is a schematic diagram of a procedure of convolution calculation according to an embodiment.

In this embodiment, only the convolution layer is used in the intermediate layer in the generated initial model, and any other calculation layers such as an activation layer are not introduced. With reference to FIG. 5, for the first convolution layer, 16 convolution kernels are included in the first convolution layer based on the configured quantity of output channels. Each convolution kernel is a 3×3 matrix including different values. The values are convolution kernel parameters. Convolution kernel parameters in the final image processing model are obtained by training and optimizing convolution kernel parameters in the initial model. The convolution kernel parameters may be totally different or partially the same.

The image data is inputted from the input layer of the image processing model into the intermediate layer. Here, the image data of a first image is a two-dimensional matrix including representation values. For example, for the first convolution layer including 16 convolution kernels, convolution calculation is performed on the image data of the first image respectively with each convolution kernel in the first convolution layer, and then 16 pieces of result data are outputted. The image data of the first image is the representation values of each pixel in the first image. That is, 16 values may be obtained after the representation values of each pixel in the first image pass through the first layer of the convolution layers.

For the second convolution layer, 16 groups of convolution kernels are included in the second convolution layer based on the configured quantity of output channels (different quantities of output channels may be configured). Each group includes 32 convolution kernels, and each convolution kernel is a 3×3 matrix including different values. The 16 pieces of result data outputted by the first convolution layer are inputted into the second convolution layer, and the second convolution layer outputs 32 pieces of result data. In an embodiment, in a procedure in which convolution calculation is performed in the second convolution layer, convolution calculation is performed on the 16 pieces of result data outputted by the first convolution layer respectively with 16 convolution kernels in one group of convolution kernels to obtain 16 convolution results, and the 16 convolution results are summed to obtain output data (one of the 32 pieces of result data) corresponding to the convolution kernels in the group. In this way, such operation is performed on the 32 groups of convolution kernels to obtain result data of 32 channels in the second convolution layer.

A third convolution layer includes 32 groups of convolution kernels, and each group of convolution kernels includes 32 convolution kernels. A processing method thereof is the same as that of the second convolution layer. For each group of convolution kernels, convolution calculation is performed on 32 convolution kernels respectively with the 32 pieces of result data outputted by the second convolution layer, and 32 obtained convolution results are summed, to obtain output data corresponding to this group of convolution kernels. In this way, such operation is performed on the 32 groups of convolution kernels, to obtain result data of 32 channels in the third layer of the convolution layers. Similar to the third convolution layer, result data of 32 channels may also be obtained in a fourth convolution layer, and deconvolution is implemented by using convolution of 4 channels in the last convolution layer. Because super-resolution of 2 times is to scale up one pixel into four pixels, in the initial model, a fifth convolution layer of the intermediate layers outputs result data of four channels. The result data may respectively correspond to representation values of four pixels on the upper left, the upper right, the lower left, and the lower right. Finally, the output layer may directly output the result data of the four channels. According to an embodiment, the output layer may process the result data, and directly output a high-resolution target image obtained by performing arrangement according to channel output data of the four channels. Through this method, a deconvolution layer in which stride=2 is achieved by using the convolution layer including 4 channels. That is, in the last layer configured in the initial model, deconvolution is actually implemented by using convolution.

In an embodiment, calculating result data of the output channels in each convolution layer in the intermediate layer includes: respectively performing one-to-one corresponding convolution calculation on the input data with each group of convolution kernels, and performing summation to obtain result data of the output channel corresponding to the group of convolution kernels. In the convolution layer, each group of convolution kernels corresponds to one output channel. Therefore, a quantity of the groups of convolution kernels is equal to a quantity of output channels. In another embodiment, an alternative calculation manner may be used. The convolution calculation manner between each piece of input data and each convolution kernel may include a plurality of combinations. An averaging calculation or the like may be performed after convolution calculation is performed on each piece of input data with the convolution kernels. It may be understood that, regardless of which calculation manner is used, the convolution kernel parameters in the initial model may be trained and optimized based on the finally outputted result data after calculation, and it is ensured that, after one or more times of training and optimization, if the first image is inputted again, a difference between representation values of pixels at the same image location between a target image that is indicated by finally outputted result data corresponding the first image and the second image is relatively small. For example, the difference between the representation values of the two is less than a preset threshold, or a difference between representation values of a preset proportion is less than a preset threshold.

After the image data of the first image is calculated by the initial model, the result data may be finally outputted. Each value in the result data is a representation value of a pixel, at a location corresponding to the first image, in the target image on which super-resolution processing is performed. For example, the representation value may be a lightness value, a luminance value, a Y-channel value, an RGB value, or the like, at the location corresponding to the first image, in the target image on which super-resolution processing is performed. Also, the representation value may be grayscale values of channels of a multispectral camera, grayscale values of channels of a special camera (such as an infrared camera, an ultraviolet camera, or a depth camera), grayscale values of corresponding channels of a remote-sensing image, or the like. As shown in FIG. 1, after super-resolution processing of 2 times is performed on the low-resolution image, the result data including the channel output data of the 4 channels is outputted, and the target image may be combined and obtained based on the result data.

In an embodiment, if the outputted representation value (that is, the value in the outputted result data) represents a Y-channel value, when the target image is combined based on a Y-channel value of one pixel and UV-channel values of another two color difference signals of the same pixel, which may be obtained through an interpolation processing, YUV data of the pixel may be obtained. Finally, the target image on which super-resolution processing is performed may be obtained by performing arrangement according to image locations of all pixels. In an embodiment, if the outputted representation value (that is, the value in the outputted result data) represents a lightness value, when the target image is combined based on a lightness value V of one pixel and a hue value H and a saturation value S of the one pixel, which may be obtained through an interpolation processing, HSV data of the pixel may be obtained. Finally, the target image on which super-resolution processing is performed is obtained by performing arrangement according to image locations of all pixels. Similarly, HSL data may be combined and obtained by performing similar processing on an outputted luminance value L, and the target image on which super-resolution processing is performed may also be obtained by performing arrangement according to image locations of all pixels In an embodiment, when the outputted representation value (that is, the value in the outputted result data) is an RGB value, an RGB value of each pixel may be directly combined and obtained based on an R value, a G value, and a B value of a pixel at each pixel location, and an RGB target image on which super-resolution processing is performed is obtained by performing arrangement according to image locations of all pixels.

When the input data of the to-be-processed image is RGB data, that is, when the representation value of the pixel is an RGB value, there are two approaches for performing super-resolution processing. One is to configure three image processing models and respectively perform calculation on an R value, a G value, and a B value, respectively output corresponding result data, obtain an R value, a G value, and a B value of the target image based on the respectively outputted result data, and combine the RGB values to obtain the target image. In this case, when the image processing model is trained, training and optimization may alternatively be performed for the R value, the G value, and the B value. In another approach, the image processing model includes three input channels, which respectively correspond to an R value, a G value, and a B value of each pixel of the to-be-processed image. Three groups of corresponding N*N channels are outputted, where each group of N*N channels corresponds to the R value, the G value, and the B value. Thereafter, the RGB values are combined to obtain the target image.

In an embodiment, when the image processing model is deployed and target image data of the to-be-processed image is processed, it may determine whether the obtained target image data is an RGB value. If it is determined that the obtained target image data is an RGB value, the RGB value is used as the target image data, and three image processing models are selected, so that the RGB value is respectively processed through the image processing models to obtain result data of the N*N channels corresponding to the RGB value. In an embodiment, the same processing may be performed on the YUV data, the HSV data, the HSL data, and the like. Super-resolution processing of N times is performed on the to-be-processed image by selecting three image processing models.

In this embodiment of the present disclosure, the foregoing procedure of inputting the first image to obtaining the result data is regarded as a procedure of performing super-resolution processing on the first image by the initial model.

Comparing the target image with the second image after super-resolution processing is performed on the first image based on the initial model to obtain the target image mainly includes: comparing representation values of pixels at each corresponding image location of the target image and the second image. For example, a representation value of a vertex pixel in the upper left corner of the target image is compared with a representation value of a vertex pixel in the upper left corner of the second image to obtain a difference between the representation values. Similarity information between the target image and the second image is determined according to differences of representation values of all pixels or pixels in a preset area range (for example, pixels in more than 80% image areas of the target image and the second image). If the similarity information does not satisfy an optimization condition, it is regarded that the initial model may perform super-resolution processing on the first image, and the same processing continues on the first image until the similarity satisfies the optimization condition. Here, the optimization condition may be predetermined by a user or automatically preset in the apparatus or device.

In an embodiment, the similarity information between the target image and the second image may be an average value of the differences between the representation values of all the pixels in the two images. If the average value is less than a first similarity threshold, the optimization condition is not satisfied. In an embodiment, the similarity information between the target image and the second image may be differences between representation values of pixels at each image location. If differences between representation values of more than M pixels are less than a preset second similarity threshold, the optimization condition is not satisfied.

If the optimization condition is satisfied, the convolution kernel parameters included in the convolution layers of the intermediate layer may be adjusted in reverse and optimized, and after the adjustment and the optimization are performed, super-resolution processing is performed on the first image again through the adjusted and optimized initial model. If the similarity information between a target image obtained after processing is performed again and the second image does not satisfy the optimization condition, a next first image is obtained, and the initial model that is initially optimized may be used to perform super-resolution processing. If the optimization condition is still not satisfied, super-resolution processing is performed again after continuing to adjust and optimize the convolution kernel parameters of the convolution kernels in the convolution layers. By performing super-resolution processing on a certain number of first images and optimizing the initial model, an image processing model may obtain convolution kernel parameters that are trained and optimized.

A value of a target image channel of the first image may be used as training input data. For example, the Y-channel value of the first image is used as the training input data to be inputted from the input layer, and after the convolution calculation, result data outputted from the output layer includes a Y-channel value of N*N channels. When it is determined that the convolution kernel parameters of the convolution kernels in the convolution layers in the initial model needs to be optimized, a difference between the outputted Y-channel value of the N*N channels and a Y-channel value of the second image is determined. Based on the difference, it is further determined whether the difference satisfies the optimization condition. If the difference satisfies the optimization condition, the convolution kernel parameters of the convolution kernels in the convolution layers in the initial model performs training to optimize the convolution kernel parameters. Otherwise, a next image continues to be obtained as the first image, and a Y-channel value is extracted.

Figure 6:
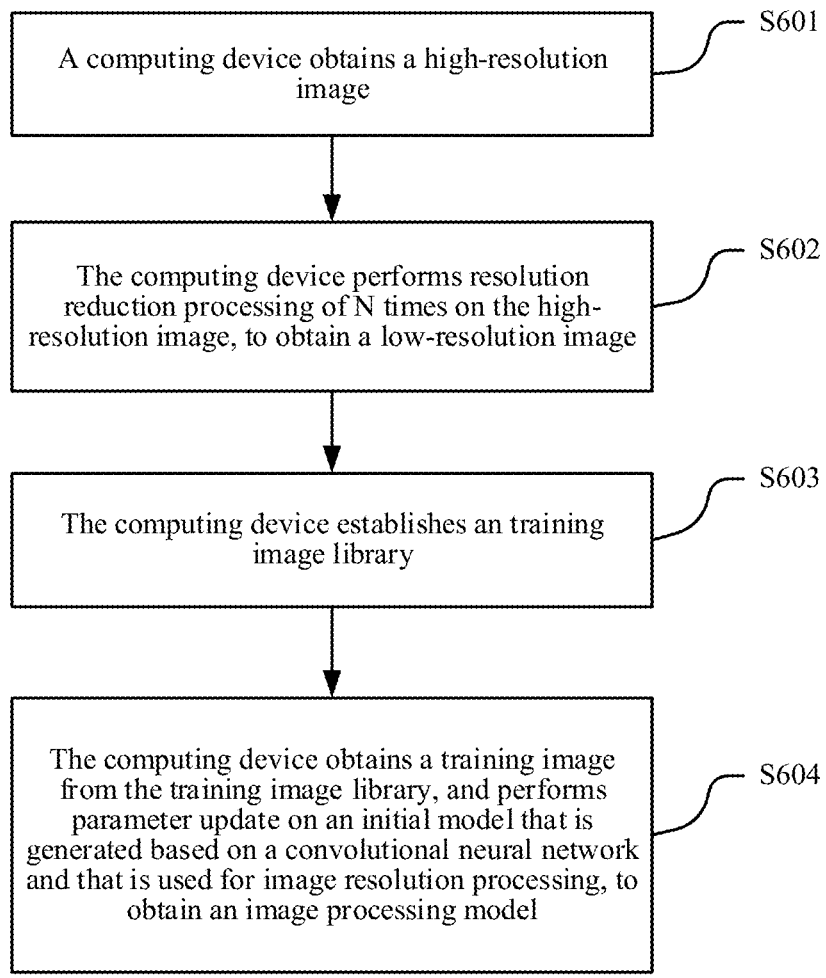
FIG. 6 is a flowchart of a method for obtaining a first image and a second image to train and optimize an initial model according to an embodiment.

FIG. 6 is a flowchart of a method for obtaining a first image and a second image to train and optimize an initial model according to an embodiment. The method is performed by a computing device. The computing device may be a server or an intelligent terminal capable of providing a video and/or image service. The method includes the following steps. In S601, a computing device obtains a high-resolution image, the high-resolution image being a second image. For example, the high-resolution images may be obtained from some websites providing high-definition images. In S602, the computing device performs resolution reduction processing of N times on the high-resolution image to obtain a low-resolution image, the low-resolution image being a first image. In S603, the computing device establishes a training image library based on a certain amount of obtained first images and second images. In S604, the computing device obtains a training image from the training image library, and optimizes an initial model that is generated based on a convolutional neural network and that is used for image resolution processing, to obtain an image processing model.

In an embodiment, the image processing model obtained after training and optimization may be deployed in an intelligent terminal or an application server, and may be used for performing super-resolution processing on an image or a video. In an embodiment, before the image processing model is deployed, the trained and optimized image processing model may be alternatively processed to obtain a better image processing model.

In an embodiment, the trained and optimized image processing model (may be referred to as an initial image processing model) may be alternatively processed. That is, the processing mainly includes performing model compression processing on the initial image processing model to obtain a better image processing model that may be used for deployment. For example, the image processing model may be used on a website for a user to view a video or an image. In this embodiment, because when the initial model is designed, only the convolution layers are used in the intermediate layer, the initial image processing model may be compressed and optimized through a special processing manner. For example, a plurality of convolution layers may be compressed and combined into one convolution layer, so that super-resolution processing may be performed more quickly after the deployment. For example, the five convolution layers shown in Table 1 may be compressed into one convolution layer, and the above-described five convolution calculations may be combined into one convolution calculation, which may greatly reduce processing time of the super-resolution calculation.

In an embodiment, a method for combining two convolution layers may include marking a convolution layer parameter of a first convolution layer as $w_1$, marking a convolution layer parameter of a second convolution layer as $w_2$, and marking a combined convolution layer parameter as $w_3$. As shown in table 2, wi (i=1, 2, 3) is a four-dimensional array, where a first dimension is a height, a second dimension is a width, a third dimension is a quantity of inputted channels, and a fourth dimension is a quantity of outputted channels.

TABLE 2

| Convolution layer parameter | Height | Width | Quantity of input channels | Quantity of output channels |
|---|---|---|---|---|
| $w_1$ | $h_1$ | $w_1$ | $c_1$ | $c_2$ |
| $w_2$ | $h_2$ | $w_2$ | $c_2$ | $c_3$ |
| $w_3$ | $h_1 + h_2 - 1$ | $w_1 + w_2 - 1$ | $c_1$ | $c_3$ |

That is, through the two calculation formulas in the foregoing Table 2: $h_1+h_2-1$ (Equation (1)) and $w_1+w_2-1$ (Equation (2)), a size of the combined convolution kernel, the quantity of inputted channels, and the quantity of outputted channels may be obtained. Using the first convolution layer and the second convolution layer in Table 1 as an example, after the two convolution layers are combined, a height of each convolution kernel is: 3+3−1=5, and a width of each convolution kernel is 3+3−1=5. The quantity of inputted channels is 1, which is the quantity of channels of the first convolution layer, and the quantity of outputted channels is 32, which is the quantity of output channels of the second convolution layer. That is, in the combined convolution layer (which is referred to as an initial combined convolution layer), a convolution kernel is 5*5*1*32. Further, a combined $w_3$ is used as a new first convolution layer to be combined with the third convolution layer $w_4$ (which is used as a new second convolution layer). In this case, a height of a combined $w_5$ is: 5+3−1=7, a width thereof is 5+3−1=7, a quantity of input channels is 1, and a quantity of output channels is 32, which is the quantity of output channels of the third convolution layer $w_4$. That is, in the new convolution layer (which is referred to as a new initial combined convolution layer), a convolution kernel is 7*7*1*32. By analogy, a combined convolution layer of 11×11×1×4 may be obtained. The size of the convolution kernel in the convolution layer is 11×11, and one input channel and four output channels are included.

Convolution kernel parameters after the combination may be calculated through a manner of convolution kernel combination calculation. That is, convolution kernels in two convolution layers may be calculated using matrix multiplication. Here, a specific calculation may include respectively representing a convolution kernel in the first convolution layer and a convolution kernel in the second convolution layer by using a convolution kernel matrix, the first convolution layer and the second convolution layer being included in the intermediate layer in the initial model on which the parameter update is performed, and performing convolution combination calculation by using matrix multiplication corresponding to the convolution kernel matrix to obtain a combined convolution kernel. A convolution kernel in an $x^{th}$ row and a $y^{th}$ column of the combined convolution kernel is a sum of new convolution kernels obtained by convolving each element in an $i^{th}$ row of a convolution kernel matrix corresponding to the first convolution layer with each element in a $j^{th}$ column of a convolution kernel matrix corresponding to the second convolution layer one by one.

Using the foregoing five convolution layers as an example, a quantity of input channels corresponding to input data of the first convolution layer is referred to as an initial quantity $c_1$ of channels, and a quantity of output channels corresponding to output data of the first convolution layer is referred to as a middle quantity $c_2$ of channels. Also, a quantity of output channels corresponding to output data of the second convolution layer is referred to as an end quantity $c_3$ of channels. Therefore, the first convolution layer and the second convolution layer may be represented by using a convolution kernel matrix. That is, the first convolution layer $w_1$ may be seen as a matrix A of $c_1*c_2$, the second convolution layer $w_2$ may be seen as a matrix B of $c_2*c_3$, and the initial combined convolution layer $w_3$ obtained by combining the first convolution layer and the second convolution layer may be seen as a matrix C of $c_1*c_3$. Each element in the three matrices is a convolution kernel. A method of convolution combination calculation is similar to matrix multiplication, in which a combined matrix is obtained by "multiplying" two matrices. A value of an element of an $i^{th}$ row and $j^{th}$ column in the combined matrix is: a sum of new convolution kernels obtained by convolving each element in $i^{th}$ rows of all left-multiplication matrices with each element in $j^{th}$ columns of all right-multiplication matrices one by one. That is, a convolution kernel of an $x^{th}$ row and a $y^{th}$ column of the combined convolution kernel matrix is marked as C(x, y), and a formula is as follows:

$$C(x, y) = \sum_{i=1}^{c_2} A(x, i) * B(i, y) \qquad (3)$$

Here, "*" represents two-dimensional convolution operation. Through the Equation 3, each convolution kernel after the first convolution layer and the second convolution layer are combined may be obtained, and convolution kernel parameters of convolution kernels in the initial combined convolution layer may be further determined.

In an embodiment, if the intermediate layer includes only the first convolution layer and the second convolution layer, the initial combined convolution layer may be directly determined as the combined convolution layer. If the intermediate layer includes a plurality of convolution layers, the initial combined convolution layer is used as a new first convolution layer based on the Equation 3, and a next convolution layer (such as the third convolution layer) and/or an initial combined convolution layer obtained by combining another two convolution layers in the intermediate layer as a new second convolution layer may be used to form a new initial combined convolution layer. The foregoing step of calculating the combined convolution kernel and obtaining a new initial combined convolution layer is performed repeatedly, to finally obtain the combined convolution kernel. In an embodiment, a size of the obtained combined convolution layer is the same as w and h that are obtained by performing calculation based on the Equation 1 and the Equation 2 and by performing calculation on convolution layer parameters of two convolution layers or convolution layer parameters of a plurality of convolution layers.

In an embodiment, after the convolution layer combination and the image processing model including the input layer, the output layer, and the combined convolution layer is obtained, it may test whether the generated convolution kernel in the combined convolution layer is a separable convolution kernel. For example, for the five convolution layers in Table 1, the four convolution kernels obtained after combination are separable convolution kernels. Therefore, some decomposition algorithms may be used. For example, by using a singular value decomposition (SVD) algorithm, each convolution kernel included in the unique combined convolution layer is decomposed into one row and one column, and the original one time of two-dimensional convolution is decomposed into two times of one-dimensional convolution, and the final image processing model is obtained after the unique combined convolution layer is decomposed. In this way, a calculation speed of performing convolution calculation may be effectively improved.

After the available image processing model is obtained, the image processing model may be deployed in an application server providing a service such as video playing or image display, or deployed in an intelligent terminal in which a related video or image application is installed. In this way, for each video frame or a single image in a video, super-resolution processing may be performed through the image processing model, so that a high-resolution or low-resolution image may be provided to a user as required.

In an embodiment, the video frame or the image may be an image including a YUV image channel, where Y represents a luminance degree, and U and V represent chrominance. When super-resolution processing is performed on the image, an image processor may process a value in a Y image channel (that is, a Y-channel value) of a video frame or a single image on which super-resolution processing needs to be performed, and values of a U image channel and a V image channel (a U-channel value and a V-channel value) may be processed by using another manner. For example, U values and V values of a plurality of pixels on which super-resolution processing is performed may be obtained by using an interpolation calculation.

Figure 7:
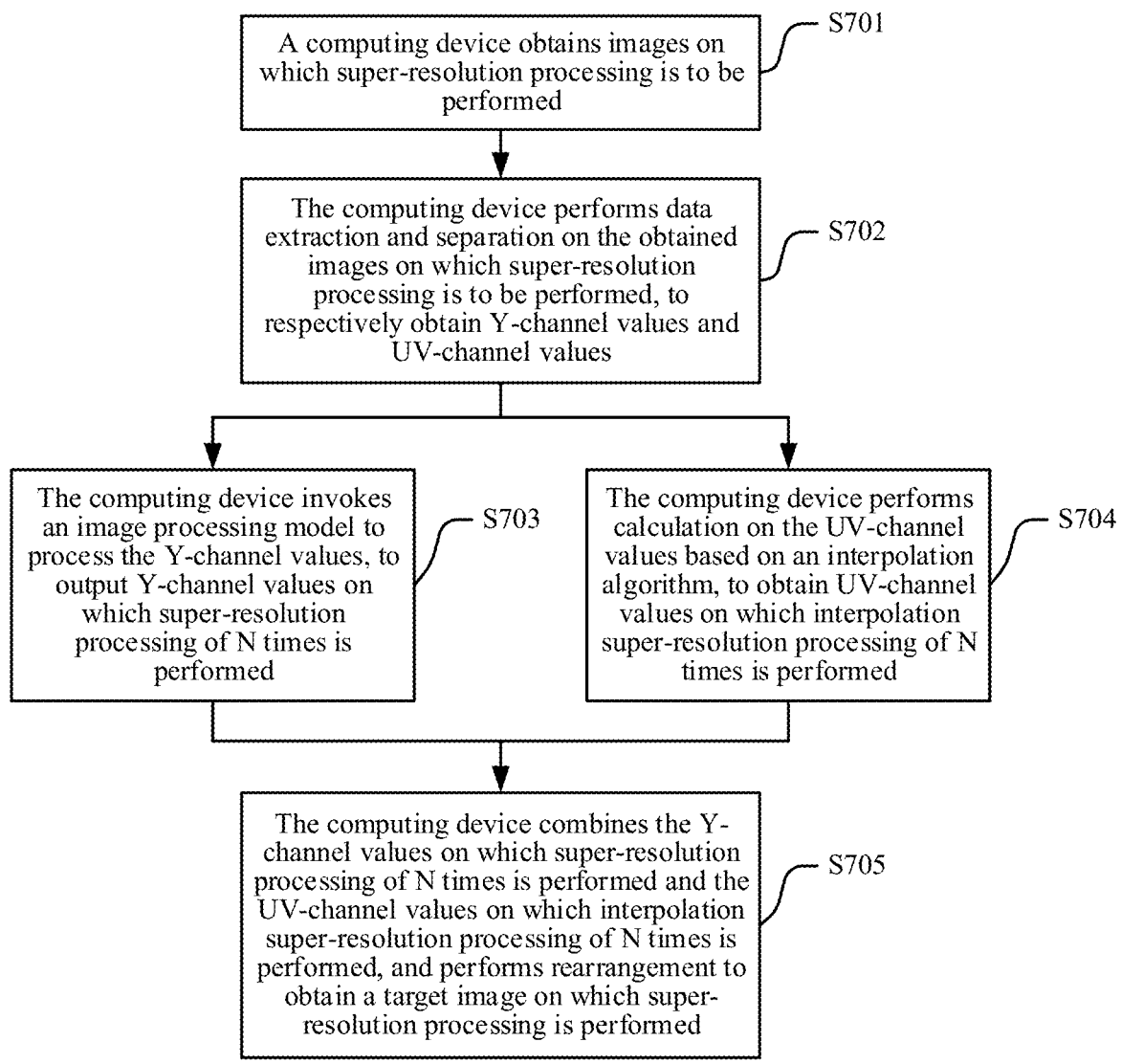
FIG. 7 is a flowchart of a method for performing super-resolution processing on an image according to an embodiment.

FIG. 7 is a flowchart of a method for performing super-resolution processing on an image according to an embodiment. The method is performed by a computing device. The computing device is a server or an intelligent terminal capable of providing a video and/or image service. In S701, a computing device obtains images on which super-resolution processing is to be performed, the images may be some image frames of a video in which resolution needs to be improved, some images captured by a low-resolution camera apparatus, or some other low-resolution image. In an embodiment, an image in which the resolution is less than a preset resolution threshold may be, for example, an image with the 540P resolution or less. The low-resolution image may be used as a to-be-processed image to perform super-resolution processing. In another embodiment, the low resolution and the high resolution may be relatively determined. When super-resolution processing needs to be performed on some images, the images may be determined as the low-resolution images regardless of whether the resolution of an image is 540P or less. That is, if the resolution of an image is 1080P, it may be still determined as a low-resolution image when compared to other images of higher-quality, such as 2K.

In S702, the computing device performs data extraction and separation on the obtained images on which super-resolution processing is to be performed, to respectively obtain Y-channel values and UV-channel values. In an embodiment, a non-YUV image may be converted into an image of a YUV format, to perform S702. In S703, the computing device invokes an image processing model to process the Y-channel values, to output Y-channel values on which super-resolution processing of N times is performed. In S704, the computing device performs calculation on the UV-channel values based on an interpolation algorithm, to obtain UV-channel values on which interpolation super-resolution processing of N times is performed. For example, the interpolation algorithm may be nearest neighbor interpolation (a grayscale value of a converted pixel is equal to a grayscale value of an input pixel closest to the converted pixel), double linear interpolation, bicubic interpolation, Lanczos interpolation, or the like. In S705, the computing device combines the Y-channel values on which super-resolution processing of N times is performed and the UV-channel values on which interpolation super-resolution processing of N times is performed, and performs re-arrangement to obtain a target image on which super-resolution processing is performed.

In the embodiments of the disclosure, a model including an intermediate layer used for convolution calculation may be accurately and comprehensively trained and optimized based on an image before resolution reduction processing and an image after resolution reduction processing, to finally obtain an image processing model capable of performing super-resolution processing of N times. Based on the image processing model, a mapping relationship between the low-resolution image and the high-resolution image does not need to be searched, and super-resolution calculation may be directly performed on related data of the image or the video frame, so that super-resolution processing on the image or the video frame can be quickly implemented, and super-resolution processing speed and efficiency are improved. In addition, the super-resolution processing on the image is more accurate and stable.

Figure 8:
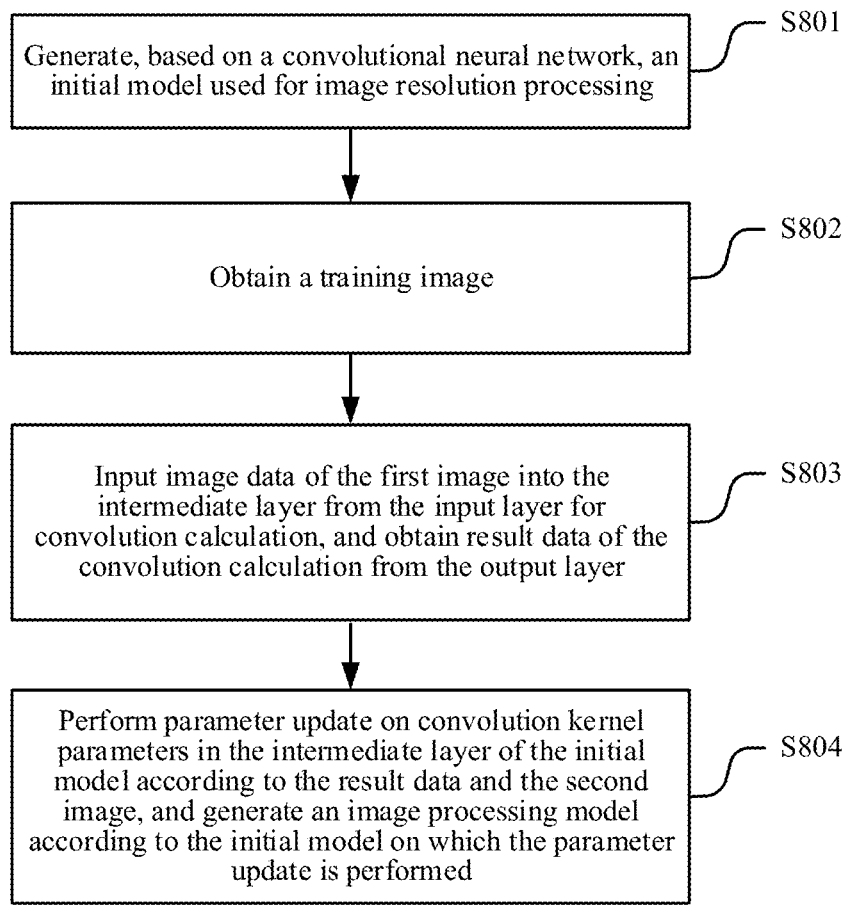
FIG. 8 is a flowchart of a method for optimizing an image processing model according to an embodiment.

FIG. 8 is a flowchart of a method for optimizing an image processing model according to an embodiment. The method may be performed by a computing device. The computing device is a server or an intelligent terminal capable of providing a video and/or image service. The method is mainly training and optimization on an image processing model used for performing super-resolution processing on an image. The method includes the following steps.

In S801, the method may generate, based on a convolutional neural network, an initial model used for image resolution processing, the initial model including an input layer, an output layer, and an intermediate layer. The intermediate layer is a convolution layer for convolution calculation. The intermediate layer of the initial model may include a convolution layer, but may not include another layer structure such as an activation layer. In this way, combination can be conveniently performed on the intermediate layer more quickly and accurately, and a plurality of convolution layers are combined into one convolution layer. Aside from the input layer and the output layer, the intermediate layer may include a plurality of layers. A structure of the initial model may be as shown in FIG. 4.

In step S802, the method may obtain a training image, the training image including a first image and a second image, and the first image being an image obtained by performing resolution reduction processing of N times on the second image. The training image may be various images or a video frame in a video. The second image is an image of an original resolution, and is generally a high-resolution image. For example, the second image may be an image of 1080P, or even an image of a higher resolution 2K or 4K. The first image may be obtained by performing resolution reduction processing on the second image. After the high-resolution images are obtained, interpolation processing is performed on each high-resolution image to reduce the resolutions of the images. The first images and the second images are in a one-to-one correspondence. To obtain a better image processing model through training and optimization, the obtained first images may be trained iteratively to obtain a high-resolution image (e.g., the second images), or even higher-resolution images. The first image needs to be inputted into the initial model for convolution calculation. The convolution calculation may be regarded as a procedure of performing super-resolution processing on the first image. The second image is used for verifying a high-resolution target image corresponding to result data outputted after the initial model performs convolution calculation on the first image, to determine whether to train and optimize convolution kernel parameters in the initial model.

In S803, the method may input image data of the first image into the intermediate layer from the input layer for convolution calculation, and obtain result data of the convolution calculation from the output layer, the result data including channel output data of N*N channels, where N is a positive integer greater than or equal to 2. If the image processing model obtained through training and optimization is capable of improving a resolution of an image by N times, result data including channel output data of N*N channels needs to be obtained through convolution calculation. A value of each location in the channel output data of the N*N channels is a representation value of a pixel at a corresponding location in a super-resolution image. For example, if the image processing model obtained through training and optimization is to perform super-resolution processing of 2 times, one original pixel needs to be changed into four pixels. For specific distributions of the four pixels, refer to FIG. 1. The target image corresponding to the result data is an image obtained by combining values of the channel output data included in the result data, and one value in each piece of the channel output data in the result data is used for representing a representation value of one pixel in the target image.

The image data inputted into the input layer of the image processing model is a two-dimensional matrix. For example, when the first image is an image with a resolution of M*M (for example, 960*540), the inputted image data is also a two-dimensional matrix of M*M (for example, correspondingly 960*540). Values of the two-dimensional matrix and the representation values of the pixels of the first image are in a one-to-one correspondence, that is, a value of a first row and a first column of the two-dimensional matrix is a representation value (for example, a lightness value, or a luminance value, or a Y-channel value, or even the foregoing image data of a remote-sensing image or a geological radar image) of a pixel of a first row and a first column of the first image. In an embodiment, if RGB is used as the representation value, the image data inputted into the input layer is one, two, or three two-dimensional matrices. That is, the image data inputted into the input layer is any one or more of a two-dimensional matrix including corresponding R values, a two-dimensional matrix including corresponding G values, and a two-dimensional matrix including corresponding B values. Same training processing may be performed on each two-dimensional matrix corresponding to RGB.

In S804, the method may include performing parameter update on convolution kernel parameters in the intermediate layer of the initial model according to the result data and the second image, and generate an image processing model according to the initial model on which the parameter update is performed. The initial model may be trained by training and optimizing the convolution kernel parameters of the convolution layers in the intermediate layer. Specifically, whether to optimize the convolution kernel parameters in the intermediate layer may be determined based on differences between values in the result data and the representation values of the pixels in the second image.

In an embodiment, based on the result data and according to values of original locations of the pixels and corresponding locations of channel output data of the channels, re-arrangement is performed, and a target image on which super-resolution processing is performed is generated. The target image on which super-resolution processing is performed is compared with the representation values of the pixels at the image locations of the second image to determine the differences between the representation values and correctness of the convolution calculation performed by the intermediate layer.

In an embodiment, the image on which super-resolution processing is performed may not be generated based on the result data, and instead, comparison is directly performed to determine the differences between the representation values of the pixels at the corresponding locations of the second image based on the channel output data and the values corresponding to data locations. For example, in channel output data of a first channel, a value of a vertex in the upper left corner is compared with a representation value of a pixel (that is, a first pixel in a first row) of a vertex in the upper left corner of the second image, to determine a difference between the value of the vertex in the upper left corner and the representation value. In result data of a second channel, a value of a vertex in the upper left corner is compared with a representation value of a second pixel of the first row in the second image, to determine a difference between the value of the vertex in the upper left corner and the representation value. Each piece of the channel output data in the result data is a two-dimensional value matrix. Locations and quantities of values in the result data correspond to locations and quantities of the pixels in the first image. For example, if the resolution of the first image is 800*600, channel output data of each channel is also a matrix of 800*600. Values of all locations in the matrix are obtained by performing convolution calculation on representation values of pixels at corresponding locations in the first image. For example, a value of a first row and a second column of channel output data of an output channel corresponds to a pixel in a first row and a second column of the first image, and is obtained by performing convolution calculation on a representation value of the corresponding pixel in the first image.

If the differences between representation values of pixels of locations whose quantity is greater than a preset first quantity (for example, 90% of a quantity of all the pixels of the second image used as the preset first quantity), the representation values of pixels at corresponding locations in the second image do not satisfy an optimization condition in the target image corresponding to the result data. That is, the current image processing model is capable of correctly performing super-resolution processing on the first image, and the convolution kernel parameters do not need to be updated. In another embodiment, if the optimization conditions are not satisfied, it means that there are P differences indicating that two representation values are the same or the difference is within a preset difference threshold, where P is a positive integer. For example, the representation value of the pixel of the vertex in the upper left corner of the image on which super-resolution processing is performed is the same as the representation value of the vertex in the upper left corner of the second image, or a difference between the two representation values are within a preset difference threshold (for example, the difference threshold is 5).

If differences between representation values of pixels at locations whose quantity is greater than a preset second quantity (for example, 10% of the quantity of all the pixels of the second image is used as the preset second quantity) and representation values of pixels at the corresponding locations in the second image satisfy the optimization condition, the current model is not capable of correctly performing super-resolution processing on the first image, and the convolution kernel parameters need to be updated.

The convolution kernel in the convolution layer is also a two-dimensional matrix such as the foregoing mentioned 3*3 matrix. Each value in the matrix is referred to as a convolution kernel parameter. After the convolution kernel parameters are optimized and adjusted, and if the differences between the representation values of the pixels at locations whose quantity is greater than the preset first quantity, the representation values of the pixels at the corresponding locations in the second image do not satisfy the optimization condition in the target image corresponding to the result data calculated and are outputted based on the convolution kernels.

In S804, the method may specifically include determining a difference between representation values of pixels at the same image location between a target image and the second image, where the target image is an image determined according to the result data, and performing parameter update on the convolution kernel parameters in the intermediate layer of the initial model according to the difference between the representation values to generate an image processing model according to the initial model on which the parameter update is performed. In an embodiment, the image data of the first image is a Y-channel value extracted from the first image. Here, one value in each piece of the channel output data in the result data is used for representing a Y-channel value of one pixel in the target image, and the difference between the representation values is a difference between Y-channel values of pixels at the same image location between the target image corresponding to the result data and the second image. The differences between the representation values are mainly used for reflecting a changing value between a pixel at a location in the target image corresponding to the result data and a pixel at the same location in the second image, for example, a difference between Y-channel values, a difference between grayscale values, or a difference between lightness values.

In an embodiment, the image data of the first image is a Y-channel value extracted from the first image, and the target image corresponding to the result data is obtained by combining Y-channel image data, U-channel image data, and V-channel image data. Here, the Y-channel image data in the target image is obtained according to the result data, the U-channel image data in the target image is obtained by performing interpolation calculation on a U-channel value extracted from the first image, and the V-channel image data in the target image is obtained by performing interpolation calculation on a V-channel value extracted from the first image, where one value in each piece of the channel output data in the result data is used for representing a Y-channel value of one pixel in the target image.

In an embodiment, when the optimization condition is satisfied, parameter update is performed on the convolution kernel parameters in the intermediate layer of the initial model according to the difference between the representation values to optimize the convolution kernel parameters. A parameter update procedure is also an optimization procedure for the convolution kernel parameters. The optimization procedure is mainly optimizing values in a two-dimensional matrix corresponding to the convolution kernel, so that the difference, which is obtained through calculation, between the representation values does not satisfy the optimization condition. If the difference between the representation values does not satisfy the optimization condition, it indicates that the current image processing model is capable of performing relatively accurate super-resolution processing on the first image without further optimization.

Figure 9:
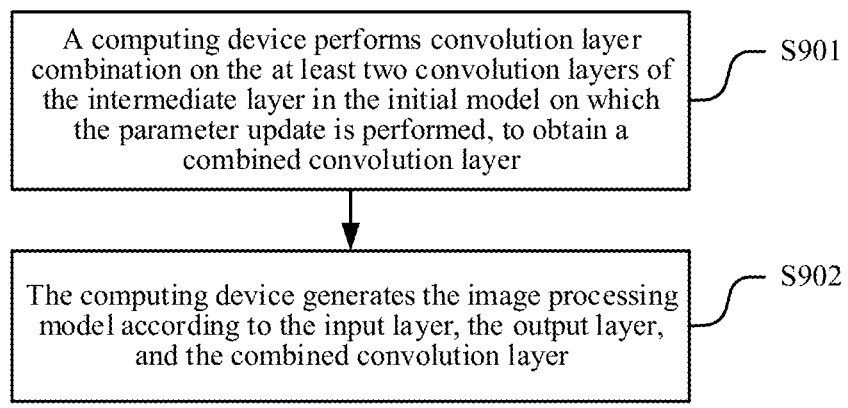
FIG. 9 is a flowchart of a method for generating an image processing model according to an optimized initial model according to an embodiment.

FIG. 9 is a flowchart of a method for generating an image processing model according to an optimized initial model according to an embodiment. The method of this embodiment is performed by a computing device. The computing device is a server or an intelligent terminal capable of providing a video and/or image service. The method may include the following steps.

In S901, the computing device performs convolution layer combination on the at least two convolution layers of the intermediate layer in the initial model on which the parameter update is performed to obtain a combined convolution layer. In an embodiment, the intermediate layer includes at least a first convolution layer and a second convolution layer. The step of performing convolution layer combination of the at least two convolution layers of the intermediate layer in the initial model on which the parameter update is performed includes combining the first convolution layer and the second convolution layer that are included in the intermediate layer in the initial model on which the parameter update is performed. The combining includes calculating combined convolution layer parameters and calculating a combined convolution kernel. The combined convolution layer may be built after the final combined convolution layer parameters and combined convolution kernel parameters are obtained. In this embodiment, the combined convolution layer parameters mainly indicate a size of the convolution kernel. For example, for the five layers of convolution structures described in Table 1, a combined convolution layer parameter obtained through calculation may be 11*11, which indicates that a size of the convolution kernel in the combined convolution layer is 11*11. The combined convolution kernels obtained through calculation build all combined convolution kernels in the combined convolution layer.

In an embodiment, the step of performing convolution layer combination on the at least two convolution layers of the intermediate layer in the initial model to obtain a combined convolution layer may include obtaining combined convolution layer parameters according to convolution layer parameters of a first convolution layer and convolution layer parameters of a second convolution layer, where the first convolution layer and the second convolution layer are included in the intermediate layer in the initial model on which the parameter update is performed, determining an initial combined convolution layer, a size of a convolution kernel in the initial combined convolution layer being the same as a value indicated by the combined convolution layer parameters, and obtaining the combined convolution layer according to the initial combined convolution layer. The combined convolution layer parameters have a convolution kernel length of $h=h1+h2-1$ and a convolution kernel width of $w=w1+w2-1$, where h1 is a height of convolution kernels set for the first convolution layer, w1 is a width of the convolution kernels set for the first convolution layer, h2 is a height of convolution kernels set for the second convolution layer, and w2 is a width of the convolution kernels set for the second convolution layer. In an embodiment, if the intermediate layer includes only the first convolution layer and the second convolution layer, the initial combined convolution layer may be directly used as the combined convolution layer. If the intermediate layer further includes other convolution layers, the initial combined convolution layer may be used as a new first convolution layer to be combined with a next convolution layer (such as the third convolution layer and/or an initial combined convolution layer obtained by combining another two convolution layers in the intermediate layer as a new second convolution layer). The foregoing step of calculating the combined convolution layer parameters and obtaining the initial combined convolution layer may be performed repeatedly to obtain the final combined convolution layer.

The combined convolution layer parameters may be determined based on the foregoing equations, that is, a size of the combined convolution layer is determined. In an embodiment, a calculation of determining the combined convolution kernel is further provided. The performing convolution layer combination on the at least two convolution layers of the intermediate layer in the initial model to obtain a combined convolution layer may include respectively representing a convolution kernel in the first convolution layer and a convolution kernel in the second convolution layer by using a convolution kernel matrix, where the first convolution layer and the second convolution layer are included in the intermediate layer in the initial model on which the parameter update is performed, and performing convolution combination calculation by using matrix multiplication corresponding to the convolution kernel matrix to obtain a combined convolution kernel. The combination may further include obtaining the initial combined convolution layer according to the combined convolution kernel obtained through calculation, the combined convolution kernel building all convolution kernels in the initial combined convolution layer, and obtaining the combined convolution layer according to the initial combined convolution layer, where a convolution kernel in an $x^{th}$ row and a $y^{th}$ column of the combined convolution kernel is a convolution kernel obtained by summing new convolution kernels, where the new convolution kernels are obtained by convolving each element in an $i^{th}$ row of a convolution kernel matrix corresponding to the first convolution layer with each element in a $j^{th}$ column of a convolution kernel matrix corresponding to the second convolution layer one by one. Here, the representing by using a convolution kernel matrix means that each element in the convolution kernel matrix corresponds to a convolution kernel in the first convolution layer or the second convolution layer. That is, each element in the convolution kernel matrix corresponding to the first convolution layer corresponds to one convolution kernel in the first convolution layer, and each element in the convolution kernel matrix corresponding to the second convolution layer corresponds to one convolution kernel in the second convolution layer. In an embodiment, for a specific calculation manner of the combined convolution kernel, refer to the foregoing descriptions corresponding to the Equation 3.

In an embodiment, if the intermediate layer includes only the first convolution layer and the second convolution layer, the initial combined convolution layer may be directly used as the combined convolution layer. If the intermediate layer further includes other convolution layers, the initial combined convolution layer may be used as a new first convolution layer to be combined with a next convolution layer (such as the third convolution layer and/or an initial combined convolution layer obtained by combining another two convolution layers in the intermediate layer as a new second convolution layer). The foregoing step of calculating the combined convolution kernel and obtaining the initial combined convolution layer may be performed repeatedly to obtain the final combined convolution layer.

In S902, the computing device generates the image processing model according to the input layer, the output layer, and the combined convolution layer. An image processing model including the input layer, the output layer, and the combined convolution layer may be directly generated. In an embodiment, the combined convolution layer may further be decomposed. That is, in S902, the computing device may perform decomposition according to the convolution kernel parameters in the combined convolution layer to decompose the convolution kernel parameters into one row of parameters and one column of parameters, and generate the image processing model according to the input layer, the output layer, and the row of parameters and the column of parameters that are obtained through decomposition. In this way, the two-dimensional convolution calculation may be converted into two times of one-dimensional convolution calculation, which may further improve calculation efficiency. In addition, the foregoing decomposition may be performed on all convolution kernels in the combined convolution layer.

In the embodiments, a model including an intermediate layer used for convolution calculation is trained and optimized based on an image before resolution reduction processing and an image after resolution reduction processing to finally obtain an image processing model capable of performing super-resolution processing of N times. Based on the image processing model generated through a special structure and a training manner, super-resolution processing on an image or a video frame can be quickly implemented, thereby improving speed and efficiency. Also, the super-resolution processing on an image based on the image processing model may be more accurate and stable.

Figure 10:
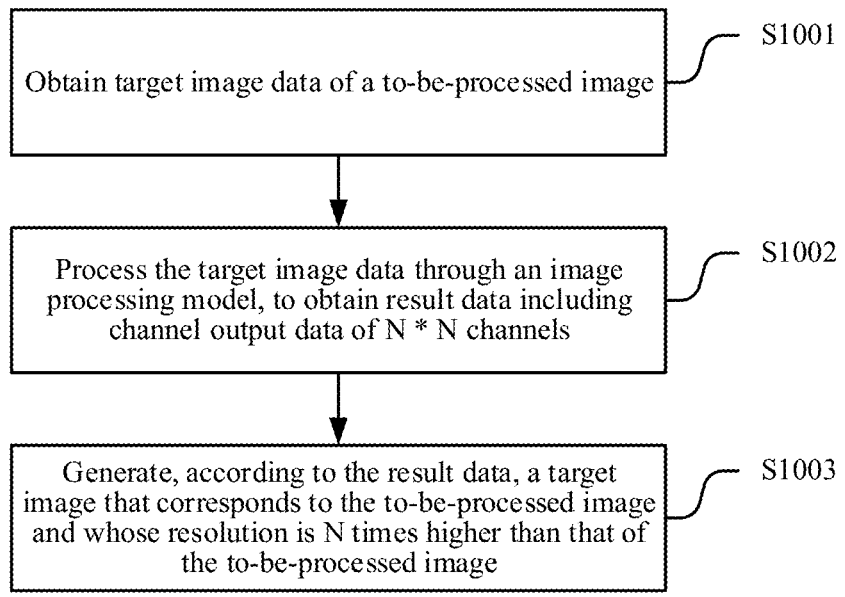
FIG. 10 is a flowchart of an image processing method according to an embodiment.

FIG. 10 is a flowchart of an image processing method according to an embodiment. The method of this embodiment may also be performed by a computing device. The computing device may be a server or an intelligent terminal capable of providing an image and/or video service. The method of this embodiment may include the following steps.

In S1001, the method may include obtaining target image data of a to-be-processed image, where the target image data may correspond to a single image on which super-resolution processing needs to be performed, or may be a video frame in a video that needs to be played for a user and on which super-resolution processing needs to be performed. The target image data may be representation values corresponding to pixels at locations in the to-be-processed image.

That super-resolution processing may be performed when the user selects a corresponding super-resolution processing function on a user interface used for displaying an image. For example, an ultra-definition display button may be set on the user interface. If the button is tapped or pressed, a resolution related to the ultra-definition display button is used as a resolution threshold. When an image is played, if a resolution of the image needed to be played is less than the resolution threshold, the image is used as the to-be-processed image, and target image data of the to-be-processed image is obtained. That is, before performing the step S1001, the method may further include determining, in response to receiving a to-be-processed image, a resolution of the to-be-processed image and performing the operation of obtaining target image data of a to-be-processed image in response to the determined resolution being less than a resolution threshold,. Here, the resolution threshold may be configured and determined on a user interface used for displaying an image. The user interface may be an interface for image browsing, or may be an interface for video playing. The to-be-processed image may be an image waiting to be displayed, or may be a video frame waiting to be played in a video.

When an image is transmitted, a resolution of transmitted data may be determined according to data transmission resource information. For example, the data transmission resource information may include available bandwidth resources or a transmission rate for transmitting images. If data transmission resources are sufficient, a transmitting end may transmit a low-resolution (less than the resolution threshold) image to an image receiving end after performing super-resolution processing on the low-resolution image. If the data transmission resources are not sufficient, the image whose resolution is less than the resolution threshold is directly transmitted. Also, a high-resolution image may be transmitted to the image receiving end after resolution reduction processing is performed on the high-resolution image. In an embodiment, the data transmission resource information between the transmitting end and the image receiving end may be obtained. The to-be-processed image is transmitted to the image receiving end in response to that the data transmission resource information satisfies a restricted condition. In S1001, the obtaining the target image data is performed in response to the data transmission resource information not satisfying a predetermined condition to transmit the generated target image that corresponds to the to-be-processed image and whose resolution is N times higher than that of the to-be-processed image to the image receiving end. Specifically, the data transmission resource information satisfies a predetermined condition when a bandwidth resource amount is less than a preset bandwidth threshold and/or when a data transmission rate is less than a preset rate threshold.

In an embodiment, a corresponding button may be alternatively set in a video player or another video playing application. After the user taps or presses the button, the video player or another video playing application first processes a to-be-played video frame as the to-be-processed image, to play a higher-resolution video to the user. In an embodiment, before the obtaining target image data of a to-be-processed image, the method further includes: determining, in response to receiving a video playing request, a target video requested by the video playing request; sequentially using video frames of the target video as the to-be-processed images according to a playing time sequence of the target video in response to a definition of the video frames of the target video being less than a video playing definition threshold, and obtaining target image data of a to-be-processed image to output target images that correspond to the to-be-processed images and whose resolutions are respectively N times higher than those of the to-be-processed images.

In S1002, the method may include processing the target image data through an image processing model to obtain result data including channel output data of N*N channels, N being a positive integer greater than or equal to 2. The image processing model may be a preset model capable of performing super-resolution processing of N times. The image processing model includes an input layer, an output layer, and an intermediate layer. Convolution kernel parameters in the intermediate layer are determined after parameter update is performed based on a training image. The training image includes a first image and a second image, and the first image is an image obtained by performing resolution reduction processing of N times on the second image. The intermediate layer in the image processing model is determined after the convolution kernel parameters in the intermediate layer are updated according to the second image and the result data, and the result data is channel output data that is obtained after the intermediate layer before the update performs convolution calculation on image data of the first image and that includes N*N channels. For the training, optimization and the generation related to the image processing model may be refer to the descriptions of the foregoing embodiments.

The image processing model is a model that is selected from a preset image processing model set according to multiples of super-resolution requested by the to-be-processed image and that corresponds to the multiples of super-resolution. A plurality of image processing models capable of providing different multiples of super-resolution processing are preset in the image processing model set.

In an embodiment, before performing the step S1001, the method may further include determining whether image data of the obtained to-be-processed image is an RGB value. If the image data of the to-be-processed image is an RGB value, the method may include obtaining the RGB value as the target image data and selecting three image processing models. Specifically, the selected three image processing model may process the RGB value to obtain result data of three N*N channels corresponding to the RGB value. A first image processing model in the three image processing models is used for processing an R value, a second image processing model is used for processing a G value, and a third image processing model is used for processing a B value. In addition, if the image data of the obtained to-be-processed image is a YUV value, a Y value is extracted from the YUV value as the target image data. In this case, the step S1002 may include processing a Y-channel value through an image processing model to obtain result data of N*N channels. For HSV data, a lightness value V may be alternatively extracted as the target image data. For HSL data, a luminance value L may be alternatively extracted as the target image data.

The image data inputted into the input layer of the image processing model may be a two-dimensional matrix. For example, when the to-be-processed image is an image whose resolution is M*M (for example, 960*540), the two-dimensional matrix is also a two-dimensional matrix of M*M (for example, 960*540), which is in a one-to-one correspondence with representation values of pixels of the to-be-processed image. A value of a first row and a first column of the two-dimensional matrix is a representation value (for example, a lightness value, or a luminance value, or a Y-channel value) of a pixel of a first row and a first column of the to-be-processed image, and a value of a first row and a second column of the two-dimensional matrix corresponds to a representation value of a pixel of a first row and a second column of the to-be-processed image, and so on.

In an embodiment, if RGB is used as the representation value, the image data inputted into the input layer may be one, two, or three two-dimensional matrices. That is, the image data inputted into the input layer is any one or more of a two-dimensional matrix constituted by corresponding R values, a two-dimensional matrix constituted by corresponding G values, and a two-dimensional matrix constituted by corresponding B values. Same super-resolution processing may be performed respectively on each two-dimensional matrix corresponding to RGB.

In S1003, the method may include generating, according to the result data, a target image that corresponds to the to-be-processed image and whose resolution is N times higher than that of the to-be-processed image. In the result data of N*N channels, each value is a representation value of one pixel. The values in the result data are set according to a preset sequence, and an image on which super-resolution processing is performed may be obtained. The preset sequence may be an arrangement sequence specified for each piece of channel data. For example, for the image processing model of 2 times, a value of a first row and a first column in a first channel is used as a representation value of a pixel of a first row and a first column of a super-resolution image, a value of a first row and a first column in a second channel is used as a representation value of a pixel of a first row and a second column of the super-resolution image, a value of a first row and a first column in a third channel is used as a representation value of a pixel of a second row and a first column of the super-resolution image, and a value of a first row and a first column in a fourth channel is used as a representation value of a pixel of a second row and a second column of the super-resolution image. That is, the image processing model performs super-resolution processing of N times on a pixel in the original image to be converted into N*N pixels. The values of the channels in the result data are sequentially arranged to constitute the representation values of the N*N pixels, and an image on which super-resolution processing is performed is finally obtained through arrangement.

In an embodiment, the target image data may be a Y-channel value of an image or a video frame. In the following steps, super-resolution processing is performed on the Y-channel value of the image. For a U-channel value and a V-channel value of the image, processing may be performed through another super-resolution processing, for example, implementing through related steps of interpolation. That is, in this embodiment, the target image data includes a Y-channel value extracted from the to-be-processed image, and one value in the result data is used for representing a Y-channel value of one pixel in the target image. According to this embodiment, a target image that corresponds to the to-be-processed image at a resolution of N times higher than that of the to-be-processed image may be generated according to the result data. The generating may include combining each value in the result data of N*N channels to obtain Y-channel image data, performing interpolation calculation on a U-channel value extracted from the first image to obtain U-channel image data, performing interpolation calculation on a V-channel value extracted from the first image to obtain V-channel image data, and combining the Y-channel image data, the U-channel image data, and the V-channel image data to obtain the target image whose resolution is N times higher than that of the to-be-processed image.

As shown below, Table 3 shows a relationship between the time consumed for performing super-resolution processing by using the image processing model according to an embodiment of the disclosure and the time consumed for performing super-resolution processing based on a mapping relationship between a low-resolution image and a high-resolution image in a related art. The same testing environments are used for this testing, where a central processing unit (CPU) is Intel E5 v4 2.40 GHz 16 cores (a processor) with an internal memory of 10G and no graphics processing unit (GPU).

TABLE 3

| Super-resolution of 2 times | Quantity of threads of CPU | Time consumed for single frame (ms) Input 960 * 540 | Time consumed for single frame (ms) Input 1920 * 800 |
| --- | --- | --- | --- |
| Using an image processing model | 1 | 19.71 | 79.92 |
| Related art | 1 | 3411.47 | 9778.41 |

Referring to Table 3, it is readily apparent that the super-resolution processing according to an embodiment of the disclosure on an image or a video frame improves speed and efficiency. In addition, the super-resolution processing is more accurate and stable.

Figure 11:
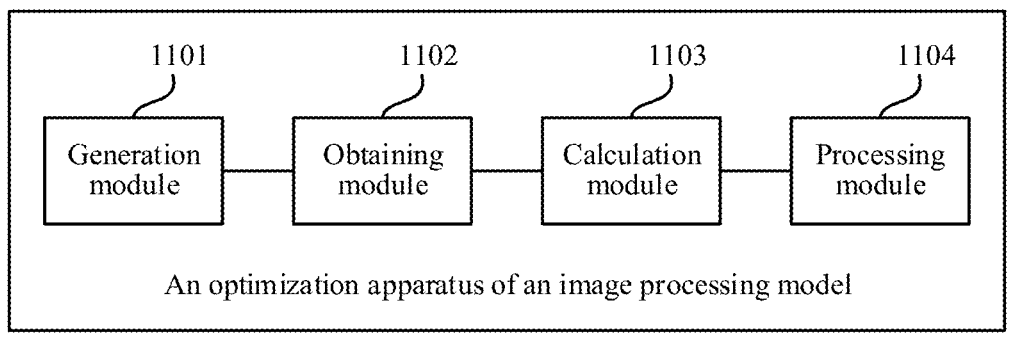
FIG. 11 is a schematic structural diagram of an optimization apparatus of an image processing model according to an embodiment.

FIG. 11 is a schematic structural diagram of an optimization apparatus of an image processing model according to an embodiment. The apparatus may be disposed in a server or an intelligent terminal capable of providing various image services. The apparatus may include the following.

The apparatus may include a generation module 1101 configured to generate, based on a convolutional neural network, an initial model used for image resolution processing, the initial model including an input layer, an output layer, and an intermediate layer and an obtaining module 1102 configured to obtain a training image, the training image including a first image and a second image, and the first image being an image obtained by performing resolution reduction processing of N times on the second image.

The apparatus may also include a calculation module 1103 configured to input image data of the first image into the intermediate layer from the input layer for convolution calculation, and obtain result data of the convolution calculation from the output layer, the result data including channel output data of N*N channels, N being a positive integer greater than or equal to 2 and a processing module 1104 configured to perform parameter update on convolution kernel parameters in the intermediate layer of the initial model according to the result data and the second image, and generate an image processing model according to the initial model on which the parameter update is performed.

In an embodiment, the processing module 1104 is configured to determine, when performing parameter update on the convolution kernel parameters in the intermediate layer of the initial model according to the result data and the second image, a difference between representation values of pixels at the same image location between a target image and the second image, the target image being an image determined according to the result data; and perform parameter update on the convolution kernel parameters in the intermediate layer of the initial model according to the difference between the representation values.

In an embodiment, the intermediate layer includes at least two convolution layers that are directly connected to each other. The processing module 1104 is configured to perform, when generating the image processing model according to the initial model on which the parameter update is performed, convolution layer combination on the at least two convolution layers of the intermediate layer in the initial model on which the parameter update is performed to obtain a combined convolution layer, and generate the image processing model according to the input layer, the output layer, and the combined convolution layer.

In an embodiment, the intermediate layer includes a first convolution layer and a second convolution layer. The processing module 1104 is configured to obtain a combined convolution layer based on performing a convolution layer combination on the at least two convolution layers of the intermediate layer in the initial model on which the parameter update is performed. Here, the combined convolution layer may include combined convolution layer parameters according to convolution layer parameters of a first convolution layer and convolution layer parameters of a second convolution layer, the first convolution layer and the second convolution layer being included in the intermediate layer in the initial model on which the parameter update is performed. The processing module 1104 may be configured to determine an initial combined convolution layer, where a size of a convolution kernel in the initial combined convolution layer is the same as a value indicated by the combined convolution layer parameters and obtain the combined convolution layer according to the initial combined convolution layer. The combined convolution layer parameters include a convolution kernel length of h=h1+h2−1, and a convolution kernel width of w=w1+w2−1, where h1 is a height of convolution kernels set for the first convolution layer, w1 is a width of the convolution kernels set for the first convolution layer, h2 is a height of convolution kernels set for the second convolution layer, and w2 is a width of the convolution kernels set for the second convolution layer.

In an embodiment, the intermediate layer includes a first convolution layer and a second convolution layer. The processing module 1104 is configured to respectively represent, when performing convolution layer combination on the at least two convolution layers of the intermediate layer in the initial model to obtain a combined convolution layer, a convolution kernel in the first convolution layer and a convolution kernel in the second convolution layer by using a convolution kernel matrix, the first convolution layer and the second convolution layer being included in the intermediate layer in the initial model on which the parameter update is performed, and perform convolution combination calculation by using matrix multiplication corresponding to the convolution kernel matrix to obtain a combined convolution kernel. The processing module 1104 is configured to obtain the initial combined convolution layer according to the combined convolution kernel obtained through calculation and obtain the combined convolution layer according to the initial combined convolution layer, where a convolution kernel in an $x^{th}$ row and a $y^{th}$ column of the combined convolution kernel is a convolution kernel obtained by summing new convolution kernels, the new convolution kernels being obtained by convolving each element in an $i^{th}$ row of a convolution kernel matrix corresponding to the first convolution layer with each element in a $j^{th}$ column of a convolution kernel matrix corresponding to the second convolution layer one by one. Here, the representing by using a convolution kernel matrix means that each element in the convolution kernel matrix corresponds to one convolution kernel in the first convolution layer or the second convolution layer.

In an embodiment, the processing module 1104 is configured to decompose, when generating the image processing model according to the input layer, the output layer, and the combined convolution layer, convolution kernel parameters in the combined convolution layer into a row of parameters and a column of parameters, and generate the image processing model according to the input layer, the output layer, and the row of parameters and the column of parameters that are obtained through the decomposition.

In an embodiment, the target image is an image obtained by combining values of the channel output data included in the result data, and one value in each piece of the channel output data in the result data is used for representing a representation value of one pixel in the target image.

In an embodiment, the image data of the first image is a Y-channel value extracted from the first image and the target image corresponding to the result data is obtained by combining Y-channel image data, U-channel image data, and V-channel image data, where the Y-channel image data in the target image is obtained according to the result data, the U-channel image data in the target image is obtained by performing interpolation calculation on a U-channel value extracted from the first image, and the V-channel image data in the target image is obtained by performing interpolation calculation on a V-channel value extracted from the first image. Here, one value in each piece of the channel output data in the result data is used for representing a Y-channel value of one pixel in the target image.

In an embodiment, the image data of the first image is a Y-channel value extracted from the first image, one value in each piece of the channel output data in the result data is used for representing a Y-channel value of one pixel in the target image, and the difference between the representation values is a difference between Y-channel values of pixels at the same image location between the target image corresponding to the result data and the second image.

For specific implementation of the functional modules of this embodiment, refer to the descriptions in the foregoing embodiments.

In the embodiments, a model including an intermediate layer used for convolution calculation is trained and optimized based on an image before resolution reduction processing and an image after resolution reduction processing to finally obtain an image processing model capable of performing super-resolution processing of N times. The image processing model may perform high-quality super-resolution processing more accurately through this training manner.

Figure 12:
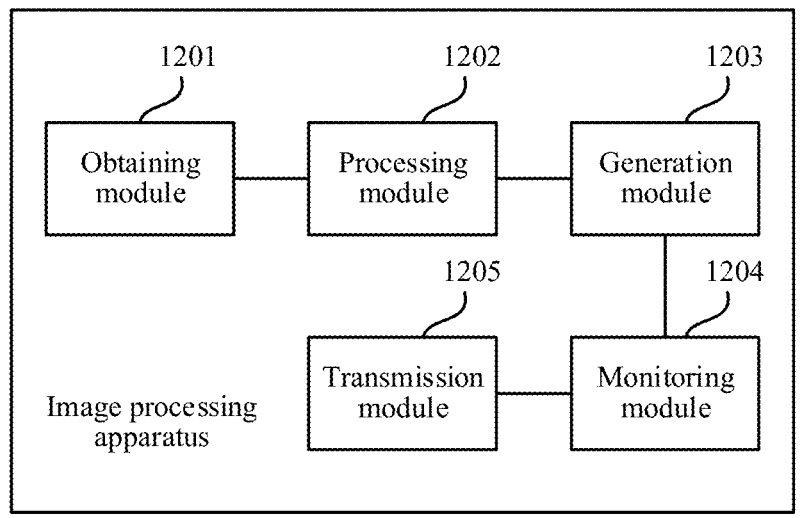
FIG. 12 is a schematic structural diagram of an image processing apparatus according to an embodiment.

FIG. 12 is a schematic structural diagram of an image processing apparatus according to an embodiment. The apparatus may be disposed in a server or an intelligent terminal capable of providing various image services. The apparatus may include the following.

The apparatus may include an obtaining module 1201 configured to obtain target image data of a to-be-processed image, a processing module 1202 configured to process the target image data through an image processing model to obtain result data including channel output data of N*N channels, where N is a positive integer greater than or equal to 2, and a generation module 1203 configured to generate, according to the result data, a target image that corresponds to the to-be-processed image and whose resolution is N times higher than that of the to-be-processed image, The image processing model including an input layer, an output layer, and an intermediate layer, convolution kernel parameters in the intermediate layer may be determined after parameter update is performed based on a training image, where the training image may include a first image and a second image, the first image being an image obtained by performing resolution reduction processing of N times on the second image. The intermediate layer in the image processing model being obtained after the convolution kernel parameters in the intermediate layer are updated according to the second image and the result data, and the result data being channel output data that is obtained after the intermediate layer before the update performs convolution calculation on image data of the first image and that includes N*N channels.

In an embodiment, the target image data includes a Y-channel value extracted from the to-be-processed image, and one value in the result data is used for representing a Y-channel value of one pixel in the target image. The generation module 1203 is configured to obtain, when generating, according to the result data, the target image that corresponds to the to-be-processed image and whose resolution is N times higher than that of the to-be-processed image, a combination of each value in the result data of N*N channels to obtain Y-channel image data. Further, the generation module 1203 is configured to perform interpolation calculation on a U-channel value extracted from the first image to obtain U-channel image data, perform interpolation calculation on a V-channel value extracted from the first image to obtain V-channel image data, and combine the Y-channel image data, the U-channel image data, and the V-channel image data to obtain the target image whose resolution is N times higher than that of the to-be-processed image.

In an embodiment, the apparatus may further include a monitoring module 1204 configured to determine a resolution of the to-be-processed image in response to receiving the to-be-processed image and control the obtaining module 1201 to perform the operation of obtaining target image data of a to-be-processed image in response to the determined resolution being less than a resolution threshold, where the resolution threshold may be configured and determined based on a user input on a user interface displaying an image.

In an embodiment, the apparatus may further include a monitoring module 1204 and a transmission module 1205. The monitoring module 1204 is configured to obtain data transmission resource information of an image receiving end, control the transmission module 1205 to transmit the to-be-processed image to the image receiving end in response to the data transmission resource information satisfying a predetermined condition, and control the obtaining module 1201 to obtain target image data of a to-be-processed image in response to the data transmission resource information not satisfying the predetermined condition to transmit the generated target image that corresponds to the to-be-processed image and whose resolution is N times higher than that of the to-be-processed image to the image receiving end. Here, the data transmission resource information satisfies a predetermined condition when a bandwidth resource amount is less than a preset bandwidth threshold and/or when a data transmission rate is less than a preset rate threshold.

In an embodiment, the monitoring module 1204 may be further configured to determine, in response to receiving a video playing request, a target video requested by the video playing request, sequentially use video frames of the target video as the to-be-processed images according to a playing time sequence of the target video based on determining that definition of the video frames of the target video is less than a video playing definition threshold, and control the obtaining module 1201 to perform the operation of obtaining target image data of a to-be-processed image to output target images that correspond to the to-be-processed images and whose resolutions are respectively N times higher than those of the to-be-processed images.

In this embodiment, based on the image processing model generated through the above-described components and training the model, the super-resolution processing on an image (such as various pictures and video frames) may improve speed and efficiency. In addition, the super-resolution processing on an image based on the image processing model may be more accurate and stable.

Figure 13:
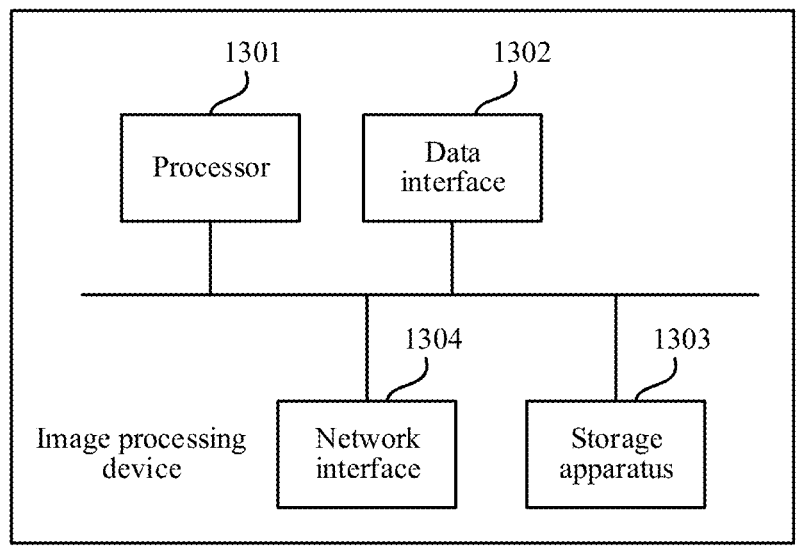
FIG. 13 is a schematic structural diagram of an image processing device according to an embodiment.

FIG. 13 is a schematic structural diagram of an image processing device according to an embodiment. The image processing device may include a power supply module, a housing structure, data interfaces 1302, network interfaces 1304, and the like. The image processing device may further include a processor 1301 and a storage apparatus 1303.

Through the data interface 1302 and the network interface 1304, the image processing device may exchange data with a server or an intelligent terminal. In this embodiment, various high-resolution images may be received from the server or an administrator through the data interface 1302 to be used as second images in training images. More high-resolution images may also be obtained through a network and the network interface 1304 to be used as the second images in the training images. The image processing device stores the training images in the storage apparatus 1303 to train an initial model to obtain an image processing model.

The storage apparatus 1303 may include a volatile memory such as a random-access memory (RAM). The storage apparatus 1303 may alternatively include a non-volatile memory such as a flash memory or a solid-state drive (SSD). The storage apparatus 1303 may alternatively include a combination of the foregoing types of memories.

The processor 1301 may be a central processing unit (CPU). The processor 1301 may further include a hardware chip. The hardware chip may be an application-specific integrated circuit (ASIC), a programmable logic device (PLD), or the like. The PLD may be a field-programmable gate array (FPGA), a generic array logic (GAL), or the like.

The storage apparatus 1303 stores computer program instructions. The processor 1301 may invoke the computer program instructions to implement the foregoing method for training and optimizing the image processing model.

In an embodiment, the storage apparatus 1303 is configured to store computer program instructions. The processor 1301 invokes the computer program instructions stored in the storage apparatus 1303 to perform the steps of the optimization method for the image processing model shown in FIG. 8.

In the embodiments of the disclosure, a model including an intermediate layer used for convolution calculation is trained and optimized based on an image before resolution reduction processing and an image after resolution reduction processing to finally obtain an image processing model capable of performing super-resolution processing of N times. The image processing model may perform high-quality super-resolution processing more accurately through this training manner.

Figure 14:
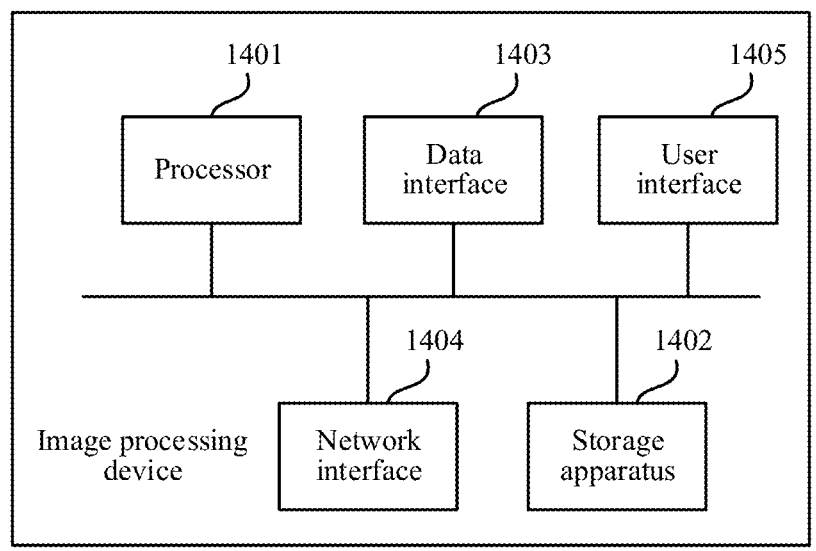
FIG. 14 is a schematic structural diagram of another image processing device according to an embodiment.

FIG. 14 is a schematic structural diagram of another image processing device according to an embodiment. The image processing device may include a power supply module, a housing structure, data interfaces 1403, network interfaces 1404, and the like. The image processing device may further include a processor 1401 and a storage apparatus 1402.

Through the network interface 1404, the image processing device may be a server configured to access a network to be connected to an intelligent terminal, or may be an intelligent terminal configured to access a network to be connected to a server. When the image processing device serves as a server, various low-resolution images or videos, or images or videos obtained by performing super-resolution processing on low-resolution images may be transmitted through the network interface 1404 to an intelligent terminal that needs to play an image. Various types of image data or video data transmitted by a content provider, an image administrator or another server may be received through the data interface 1403 and stored in the storage apparatus 1402.

When the image processing device is an intelligent terminal, the image processing device may access to an application server providing various image or video services through the network interface 1404 to obtain a low-resolution image or video. Alternatively, when a high-resolution image or video obtained by performing super-resolution processing on a low-resolution image or video is obtained, a low-resolution image or video that is transmitted by a user or another intelligent terminal may be received through the data interface 1403, or a high-resolution image or video obtained by performing super-resolution processing on a low-resolution image or video may be obtained. In addition, the image processing device may further include a user interface 1405, for example, an interface such as a touchscreen, a physical button, voice input, or image input, to receive some operations of the user and present a video or an image to the user.

The storage apparatus 1402 may include a volatile memory such as a RAM. The storage apparatus 1402 may further include a non-volatile memory such as an SSD. The storage apparatus 1402 may also include a combination of the foregoing types of memories.

The processor 1401 may be a CPU. The processor 1401 may further include a hardware chip. The hardware chip may be an ASIC, a PLD, or the like. The PLD may be an FPGA, a GAL, or the like.

The storage apparatus 1402 stores computer program instructions. The processor 1401 may invoke the computer program instructions to implement the foregoing method for processing an image based on an image processing model.

In an embodiment, the storage apparatus 1402 is configured to store computer program instructions. The processor 1401 may invoke the computer program instructions stored in the storage apparatus 1402 to perform the steps of the optimization method for the image processing model shown in FIG. 10.

According to the embodiments of the disclosure, based on the image processing model generated through the above-described embodiments, super-resolution processing on an image (such as various pictures and video frames) may be quickly implemented and may improve processing speed and efficiency. In addition, the super-resolution processing on an image based on the image processing model is more accurate and stable.

A person of ordinary skill in the art may understand that all or some of the foregoing embodiments may be implemented by a computer program instructing relevant hardware. The program may be stored in a computer readable storage medium. When the program is executed, the program may include the embodiments of the foregoing methods. The storage medium may be a magnetic disk, an optical disc, a read-only memory (ROM), a random access memory (RAM) or the like.

The foregoing descriptions are merely parts of embodiments of the present disclosure, and are not intended to limit the scope of the disclosure. A person of ordinary skill in the art may understand that all or some processes of the foregoing embodiments, and equivalent modifications made and shall still fall within the scope of the disclosure.

What is claimed is:

1. A method for generating an image processing model, performed by a computing device, the method comprising:
   generating, based on a convolutional neural network, an initial model for an image resolution processing, the initial model comprising an input layer, an output layer, and an intermediate layer;
   obtaining a training image, the training image comprising a first image and a second image, the first image being an image obtained by performing a resolution reduction processing of N times on the second image;
   inputting image data of the first image into the intermediate layer from the input layer for a convolution calculation, and obtaining result data of the convolution calculation from the output layer, the result data comprising channel output data of N*N channels, N being a positive integer greater than or equal to 2; and
   performing a parameter update on convolution kernel parameters in the intermediate layer based on the result data and the second image, and generating the image processing model according to the initial model on which the parameter update is performed,
   wherein the intermediate layer comprises at least two convolution layers that are directly connected to each other,
   wherein the generating the image processing model according to the initial model on which the parameter update is performed further comprises:
      obtaining a combined convolution layer by performing a convolution layer combination on the at least two convolution layers of the intermediate layer in the initial model on which the parameter update is performed, wherein the convolution layer combination comprises performing a matrix multiplication to obtain a combined convolution kernel; and
      generating the image processing model according to the input layer, the output layer, and the combined convolution layer.

2. The method according to claim 1, wherein the performing the parameter update on the convolution kernel parameters in the intermediate layer further comprises:
   determining a difference between first representation values of pixels in a target image and second representation values of pixels in the second image, the first representation values and the second representation values corresponding to same locations in the target image and the second image, respectively, and the target image being an image determined according to the result data; and
   performing the parameter update on the convolution kernel parameters in the intermediate layer of the initial model according to the difference between the first representation values and the second representation values.

3. The method according to claim 2, wherein the target image is an image obtained by combining values of the channel output data in the result data, and
   wherein one value in each piece of the channel output data in the result data is determined as a representation value of one pixel in the target image.

4. The method according to claim 1, wherein the obtaining the combined convolution layer further comprises:
   obtaining combined convolution layer parameters according to first convolution layer parameters of a first convolution layer and second convolution layer parameters of a second convolution layer, the first convolution layer and the second convolution layer being included in the intermediate layer in the initial model on which the parameter update is performed;
   determining an initial combined convolution layer, a size of a convolution kernel in the initial combined convolution layer being equal to a value indicated by the combined convolution layer parameters; and
   obtaining the combined convolution layer according to the initial combined convolution layer,
   wherein the combined convolution layer parameters have a convolution kernel length of $h = h1+h2-1$ and a convolution kernel width of $w=w1+w2-1$, and
   wherein h1 is a first height of convolution kernels set for the first convolution layer, w1 is a first width of the convolution kernels set for the first convolution layer, h2 is a second height of convolution kernels set for the second convolution layer, and w2 is a second width of the convolution kernels set for the second convolution layer.

5. The method according to claim 1, wherein the obtaining the combined convolution layer further comprises:

respectively representing a first convolution kernel in the first convolution layer and a second convolution kernel in the second convolution layer in a convolution kernel matrix, the first convolution layer and the second convolution layer being included in the intermediate layer in the initial model on which the parameter update is performed, and performing a convolution combination calculation based on the matrix multiplication corresponding to the convolution kernel matrix to obtain the combined convolution kernel;

obtaining an initial combined convolution layer according to the combined convolution kernel obtained through the convolution combination calculation; and obtaining the combined convolution layer according to the initial combined convolution layer, wherein a convolution kernel in an $x^{th}$ row and a $y^{th}$ column of the combined convolution kernel is obtained by summing new convolution kernels, the new convolution kernels being obtained by convolving each element in an $i^{th}$ row of the convolution kernel matrix corresponding to the first convolution layer with each element in a $j^{th}$ column of the convolution kernel matrix corresponding to the second convolution layer one by one.

6. The method according to claim 1, wherein the generating the image processing model according to the input layer, the output layer, and the combined convolution layer comprises:

decomposing convolution kernel parameters in the combined convolution layer into a row of parameters and a column of parameters; and generating the image processing model based on the row of parameters and the column of parameters.

7. The method according to claim 1, wherein the image data of the first image is a Y-channel value extracted from the first image, wherein the target image corresponding to the result data is obtained by combining Y-channel image data, U-channel image data, and V-channel image data, wherein the Y-channel image data in the target image is obtained from the result data, the U-channel image data in the target image is obtained by performing an interpolation calculation on a U-channel value extracted from the first image, and the V-channel image data in the target image is obtained by performing the interpolation calculation on a V-channel value extracted from the first image, and wherein one value in each piece of the channel output data in the result data represents a Y-channel value of one pixel in the target image.

8. The method according to claim 1, wherein the image data of the first image is a Y-channel value extracted from the first image, wherein one value in each piece of the channel output data in the result data represents a Y-channel value of one pixel in the target image, and wherein the difference between the representation values is determined based on a difference between Y-channel values of pixels at the same image location between the target image corresponding to the result data and the second image.

9. The method according to claim 1, wherein the method further comprises:

obtaining target image data of a to-be-processed image;

processing the target image data according to the image processing model of claim 1.

10. The method according to claim 9, wherein, before the obtaining the target image data of the to-be-processed image, the method further comprises:

determining a resolution of the to-be-processed image in response to receiving the to-be-processed image; and obtaining the target image data of the to-be-processed image in response to the resolution being less than a resolution threshold, wherein the resolution threshold is determined based on a user input on a user interface for displaying an image.

11. The method according to claim 9, wherein, before the obtaining the target image data of the to-be-processed image, the method further comprises:

obtaining data transmission resource information of an image receiving end;

transmitting the to-be-processed image to the image receiving end based on the data transmission resource information satisfying a predetermined condition; or obtaining the target image data of the to-be-processed image based on the data transmission resource information not satisfying the predetermined condition to transmit the generated target image that corresponds to the to-be-processed image and that has a resolution of N times higher than that of the to-be-processed image, to the image receiving end, wherein the data transmission resource information satisfies the predetermined condition when a bandwidth resource amount of the image receiving end is less than a preset bandwidth threshold or a data transmission rate is less than a preset rate threshold.

12. The method according to claim 9, wherein, before the obtaining the target image data of the to-be-processed image, the method further comprises:

determining, in response to receiving a video playing request, a target video requested by the video playing request;

sequentially using video frames of the target video as the to-be-processed images according to a playing time sequence of the target video based on a definition of the video frames of the target video being less than a video playing definition threshold; and obtaining the target image data of the to-be-processed image to output target images that correspond to the to-be-processed images and that have resolutions that are respectively N times higher than the images of the to-be-processed images.

13. An apparatus for generating an image processing model, comprising:

at least one memory configured to store computer program code; and at least one processor configured to access the memory and operate as instructed by the computer program code, the computer program code comprising:

generation code configured to cause the at least one processor to generate, based on a convolutional neural network, an initial model for an image resolution processing, the initial model comprising an input layer, an output layer, and an intermediate layer;

obtaining code configured to cause the at least one processor to obtain a training image, the training image comprising a first image and a second image, and the first image being an image obtained by performing a resolution reduction processing of N times on the second image;

calculation code configured to cause the at least one processor to input image data of the first image into the intermediate layer from the input layer for convolution calculation, and obtain result data of the convolution calculation from the output layer, the result data comprising channel output data of N * N channels, N being a positive integer greater than or equal to 2; and processing code configured to cause the at least one processor to perform a parameter update on convolution kernel parameters in the intermediate layer based on the result data and the second image, and generate the image processing model according to the initial model on which the parameter update is performed, wherein the intermediate layer comprises at least two convolution layers that are directly connected to each other, and wherein the processing code is further configured to cause the at least one processor to:

obtain a combined convolution layer by performing a convolution layer combination on the at least two convolution layers of the intermediate layer in the initial model on which the parameter update is performed, wherein the convolution layer combination comprises performing a matrix multiplication to obtain a combined convolution kernel; and generate the image processing model according to the input layer, the output layer, and the combined convolution layer.

14. The apparatus according to claim 13, wherein the processing code is further configured to cause the at least one processor to:

determine a difference between first representation values of pixels in a target image and second representation values of pixels in the second image, the first representation values and the second representation values corresponding to same locations in the target image and the second image, respectively, and the target image being an image determined according to the result data; and perform the parameter update on the convolution kernel parameters in the intermediate layer of the initial model according to the difference between the first representation values and the second representation values.

15. The apparatus according to claim 14, wherein the target image is an image obtained by combining values of the channel output data in the result data, and wherein one value in each piece of the channel output data in the result data is determined as a representation value of one pixel in the target image.

16. The apparatus according to claim 13, wherein the processing code is further configured to cause the at least one processor to:

decompose convolution kernel parameters in the combined convolution layer into a row of parameters and a column of parameters; and generate the image processing model based on the row of parameters and the column of parameters.

17. The apparatus according to claim 13, wherein the processing code is further configured to cause the at least one processor to:

obtain combined convolution layer parameters according to first convolution layer parameters of a first convolution layer and second convolution layer parameters of a second convolution layer, the first convolution layer and the second convolution layer being included in the intermediate layer in the initial model on which the parameter update is performed;

determine an initial combined convolution layer, a size of a convolution kernel in the initial combined convolution layer being equal to a value indicated by the combined convolution layer parameters; and obtain the combined convolution layer according to the initial combined convolution layer, wherein the combined convolution layer parameters have a convolution kernel length of $h = h_1+h_2-1$ and a convolution kernel width of $w=w_1+w_2-1$, and wherein $h_1$ is a first height of convolution kernels set for the first convolution layer, $w_1$ is a first width of the convolution kernels set for the first convolution layer, $h_2$ is a second height of convolution kernels set for the second convolution layer, and $w_2$ is a second width of the convolution kernels set for the second convolution layer.

18. A non-transitory computer-readable storage medium, storing computer program instructions, the computer program instructions, when executed by a processor, causes the processor to:

generate, based on a convolutional neural network, an initial model for an image resolution processing, the initial model comprising an input layer, an output layer, and an intermediate layer;

obtain a training image, the training image comprising a first image and a second image, the first image being an image obtained by performing a resolution reduction processing of N times on the second image;

input image data of the first image into the intermediate layer from the input layer for a convolution calculation, and obtaining result data of the convolution calculation from the output layer, the result data comprising channel output data of N*N channels, N being a positive integer greater than or equal to 2; and perform a parameter update on convolution kernel parameters in the intermediate layer based on the result data and the second image, and generating the image processing model according to the initial model on which the parameter update is performed, wherein the intermediate layer comprises at least two convolution layers that are directly connected to each other, and wherein the computer program instructions further cause the processor to:

obtain a combined convolution layer by performing a convolution layer combination on the at least two convolution layers of the intermediate layer in the initial model on which the parameter update is performed, wherein the convolution layer combination comprises performing a matrix multiplication to obtain a combined convolution kernel; and generate the image processing model according to the input layer, the output layer, and the combined convolution layer.

* * * * *